(12) United States Patent
Ichida et al.

(10) Patent No.: US 12,409,866 B2
(45) Date of Patent: Sep. 9, 2025

(54) VEHICLE RECORDING DEVICE AND INFORMATION RECORDING METHOD

(71) Applicant: DENSO CORPORATION, Kariya (JP)

(72) Inventors: Noriaki Ichida, Kariya (JP); Takahiro Ogawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 333 days.

(21) Appl. No.: 18/049,447

(22) Filed: Oct. 25, 2022

(65) Prior Publication Data

US 2023/0063930 A1    Mar. 2, 2023

Related U.S. Application Data

(63) Continuation of application No. PCT/JP2021/015694, filed on Apr. 16, 2021.

(30) Foreign Application Priority Data

Apr. 29, 2020   (JP) .............................. 2020-079895

(51) Int. Cl.
*B60W 60/00*   (2020.01)
*B60Q 1/50*   (2006.01)
(Continued)

(52) U.S. Cl.
CPC ......... *B60W 60/0053* (2020.02); *B60Q 1/507* (2022.05); *B60W 30/18163* (2013.01);
(Continued)

(58) Field of Classification Search
CPC ....... B60W 60/0053; B60W 30/18163; B60W 2420/403; B60W 2554/4046; B60W 2540/221; B60W 2540/223; B60W 2540/225; B60W 2540/229; B60W 2554/00; B60W 2555/00; B60Q 1/507;
(Continued)

(56) References Cited

U.S. PATENT DOCUMENTS 10,935,974 B1 *   3/2021   Fields .................. G05D 1/0061
2015/0363657 A1 *  12/2015   Shigemura ............... A61B 5/18
                                                 382/104
(Continued)

FOREIGN PATENT DOCUMENTS

JP   2000-342309 A   12/2000
JP   2003-093368 A    4/2003
JP   2007-199791 A    8/2007

*Primary Examiner* — Tuan C To
*Assistant Examiner* — Dominick Mulder
(74) *Attorney, Agent, or Firm* — Maschoff Brennan

(57) ABSTRACT

A vehicle recording device includes: a mode acquisition unit configured to acquire a signal indicative of an operating mode of an autonomous driving processing unit; a recording target setting unit configured to change a recording target in accordance with the operating mode; and a recording processing unit configured to store information of the recording target set by the recording target setting unit into a data storage unit. The recording target setting unit is further configured to: set a face image of an occupant in a driver's seat as the recording target when the autonomous driving processing unit operates in a level 3 mode; and not set the face image as the recording target when the autonomous driving processing unit operates in an occupant involvement mode.

14 Claims, 15 Drawing Sheets

(51) Int. Cl.
*B60W 30/18* (2012.01)
*G06V 20/56* (2022.01)
*G06V 20/59* (2022.01)
*G06V 40/16* (2022.01)

(52) U.S. Cl.
CPC ............ *G06V 20/56* (2022.01); *G06V 20/597* (2022.01); *G06V 40/166* (2022.01); *B60W 2420/403* (2013.01); *B60W 2554/4046* (2020.02)

(58) Field of Classification Search
CPC .... G06V 20/56; G06V 20/597; G06V 40/166; G07C 5/085; G08G 1/00
USPC .......................................................... 701/28
See application file for complete search history.

(56) References Cited

U.S. PATENT DOCUMENTS

| | | | |
|---|---|---|---|
| 2017/0088038 A1* | 3/2017 | Geller | B60Q 1/507 |
| 2017/0313319 A1* | 11/2017 | Kishi | G06V 20/597 |
| 2018/0120837 A1* | 5/2018 | Regmi | A61B 5/11 |
| 2018/0218758 A1 | 8/2018 | Maeda et al. | |
| 2018/0232967 A1 | 8/2018 | Segawa et al. | |
| 2018/0268626 A1 | 9/2018 | Arashima et al. | |
| 2018/0285665 A1* | 10/2018 | Paszkowicz | B60W 40/08 |
| 2018/0286152 A1* | 10/2018 | Iwaasa | B60W 50/08 |
| 2019/0225228 A1* | 7/2019 | Gurusubramanian | B60W 50/14 |
| 2019/0276047 A1* | 9/2019 | Suzuki | G08B 3/10 |
| 2020/0019165 A1* | 1/2020 | Levandowski | G08G 1/09675 |
| 2020/0043254 A1 | 2/2020 | Hase et al. | |
| 2020/0109957 A1 | 4/2020 | Shiga et al. | |
| 2020/0139992 A1* | 5/2020 | Oba | G08G 1/16 |
| 2020/0307638 A1* | 10/2020 | Tsuji | B60Q 1/46 |
| 2020/0307646 A1* | 10/2020 | Kato | B60W 50/00 |
| 2020/0410789 A1 | 12/2020 | Arashima et al. | |
| 2021/0034060 A1* | 2/2021 | Patnaik | H04W 4/46 |
| 2022/0049965 A1 | 2/2022 | Shiga et al. | |
| 2022/0090926 A1 | 3/2022 | Shiga et al. | |
| 2023/0175847 A1 | 6/2023 | Shiga et al. | |

* cited by examiner

FIG. 10

| | Lv. 0 | Lv. 1 | Lv. 2 | TRANSFER MODE | Lv. 3 | Lv. 4 | Lv. 5 |
|---|---|---|---|---|---|---|---|
| DRIVING MODE | ● | ● | ● | ● | ● | ● | ● |
| TIME | ● | ● | ● | ● | ● | ● | ● |
| OCCUPANT STATE — AROUSAL/NON-AROUSAL | | | | ● | ● | | |
| OCCUPANT STATE — eyes on/off | | | | ● | | | |
| OCCUPANT STATE — hands on/off | | | | ● | | | |
| OCCUPANT STATE — FACE IMAGE | | | | ● | ● | | |
| OPERATION CONTENT | ● | ● | ● | ● | | | |
| BODY SIGNAL | | | | | ● | ● | ● |
| MODE NOTIFICATION STATE | ● | ● | ● | ● | ● | ● | ● |
| TRAVELING PLACE — COORDINATE | | | | ● | ● | ● | ● |
| TRAVELING PLACE — ROAD TYPE | | | | ● | ● | ● | |
| SURROUNDING MONITORING SENSOR DATA — FRONT CAMERA | | | | | ● | ● | ● |
| SURROUNDING MONITORING SENSOR DATA — OTHERS | | | | | | ● | ● |
| OPERATION STATE OF AUTONOMOUS DRIVING ECU — RECOGNITION RESULT | | | | ● | ● | ● | ● |
| OPERATION STATE OF AUTONOMOUS DRIVING ECU — SCHEDULED ACTION | | | | | ● | ● | ● |
| OPERATION STATE OF AUTONOMOUS DRIVING ECU — CONTROL AMOUNT | | | | ● | ● | ● | ● |

( ● : RECORDING TARGET )

FIG. 11

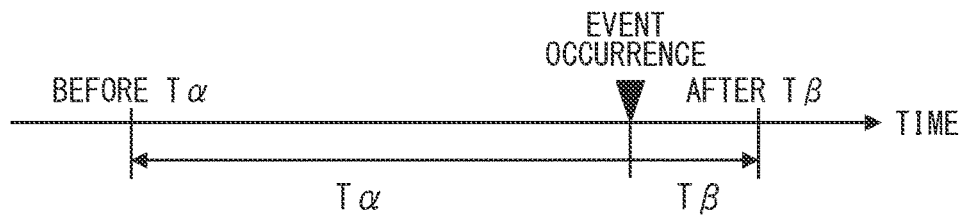

| | FRONT SENSOR | REAR SENSOR | RIGHT LATERAL SENSOR | LEFT LATERAL SENSOR |
|---|---|---|---|---|
| TRAVELING ALONG ROAD | ○ | | △ | △ |
| DECELERATION | ○ | ○ | △ | △ |
| LANE CHANGE (RIGHT) | ○ | ○ | ○ | |
| LANE CHANGE (LEFT) | ○ | ○ | | ○ |
| RIGHT TURN/LEFT TURN | ○ | | ○ | ○ |
| AUTOMATIC PARKING/ DEPARTURE | ○ | ○ | ○ | ○ |
| MRM | ○ | ○ | ○ | ○ |

( ○ : RECORD UNPROCESSED DATA + RECOGNITION RESULT
△ : RECORD ONLY RECOGNITION RESULT )

FIG. 19

| AUTONOMOUS DRIVING ECU | 2020-04-01 12:34:56 | OPERATION STATE RECOGNITION RESULT SCHEDULED ACTION CONTROL AMOUNT |
| --- | --- | --- |
| | 2020-04-01 12:34:57 | OPERATION STATE RECOGNITION RESULT SCHEDULED ACTION CONTROL AMOUNT |
| | ⋮ | |
| FRONT CAMERA | 2020-04-01 12:34:56 | OPERATION STATE RECOGNITION RESULT IMAGE DATA |
| | 2020-04-01 12:34:57 | OPERATION STATE RECOGNITION RESULT IMAGE DATA |
| | ⋮ | |
| FRONT RADAR | 2020-04-01 12:34:56 | OPERATION STATE RECOGNITION RESULT OBSERVATION DATA |
| | 2020-04-01 12:34:57 | OPERATION STATE RECOGNITION RESULT OBSERVATION DATA |
| | ⋮ | |

| 2020-04-01 12:34:56 | AUTONOMOUS DRIVING ECU | OPERATION STATE RECOGNITION RESULT SCHEDULED ACTION CONTROL AMOUNT |
|---|---|---|
| | FRONT CAMERA | OPERATION STATE RECOGNITION RESULT IMAGE DATA |
| | FRONT RADAR | OPERATION STATE RECOGNITION RESULT OBSERVATION DATA |
| | ⋮ | |
| 2020-04-01 12:34:57 | AUTONOMOUS DRIVING ECU | OPERATION STATE RECOGNITION RESULT SCHEDULED ACTION CONTROL AMOUNT |
| | FRONT CAMERA | OPERATION STATE RECOGNITION RESULT IMAGE DATA |
| | FRONT RADAR | OPERATION STATE RECOGNITION RESULT OBSERVATION DATA |
| | ⋮ | |

⋮

VEHICLE RECORDING DEVICE AND INFORMATION RECORDING METHOD

CROSS REFERENCE TO RELATED APPLICATIONS

This application is a continuation application of International Patent Application No. PCT/JP2021/015694 filed on Apr. 16, 2021, which designated the U.S. and claims the benefit of priority from Japanese Patent Application No. 2020-079895 filed on Apr. 29, 2020. The entire disclosure of all of the above application is incorporated herein by reference.

TECHNICAL FIELD

The present disclosure relates to a vehicle recording device and an information recording method of recording data indicating at least one of a status inside the vehicle and a status outside the vehicle when the vehicle travels.

BACKGROUND ART

As the vehicle recording device so far, a device that records a captured image of an on-board camera for a predetermined time before and after an event occurrence time when a predetermined event, such as a collision or sudden brake, has occurred, or a drive recorder that always records the image of the on-board camera has been proposed. For example, there has been a configuration in which image data of a front camera, speech data of a vehicle interior, and driving mode information are stored in association with each other as an always-recording type drive recorder. The driving mode information in Patent Literature 1 indicates autonomous driving or manual driving.

SUMMARY

According to one aspect of the present disclosure, a vehicle recording device for recording an operation state of an autonomous driving processing unit, which is a computer that is configured to provide an autonomous driving function, the operation state including, as an operating mode, an occupant involvement mode corresponding to any one of autonomous driving levels 0 to 2 and a level 3 mode corresponding to an autonomous driving level 3. The device includes: an information acquisition unit that is configured to acquire a plurality of types of information that can be a recording target from a plurality of sensors mounted in a vehicle; a mode acquisition unit that is configured to acquire a signal indicative of the operating mode of the autonomous driving processing unit; a recording target setting unit that is configured to change the recording target in accordance with the operating mode; and a recording processing unit that is configured to store information of the recording target set by the recording target setting unit into a data storage unit. The plurality of types of information include occupant state data indicative of a state of an occupant in a driver's seat. The information acquisition unit is further configured to acquire a face image of the occupant in the driver's seat as the occupant state data. The recording target setting unit is further configured to: set the face image as the recording target when the autonomous driving processing unit operates in the level 3 mode; and not set the face image as the recording target when the autonomous driving processing unit operates in the occupant involvement mode.

BRIEF DESCRIPTION OF DRAWINGS

FIG. 10 is a diagram showing an example of a correspondence relationship between a driving mode and an item that is a recording target.

FIG. 11 is a diagram showing a recording target period of event recording processing by a recording processing unit.

FIG. 19 is a diagram showing an example of a data recording mode by the operation recording unit.

FIG. 20 is a diagram showing another example of the data recording mode by the operation recording unit.

DESCRIPTION OF EMBODIMENTS

Figure 1:
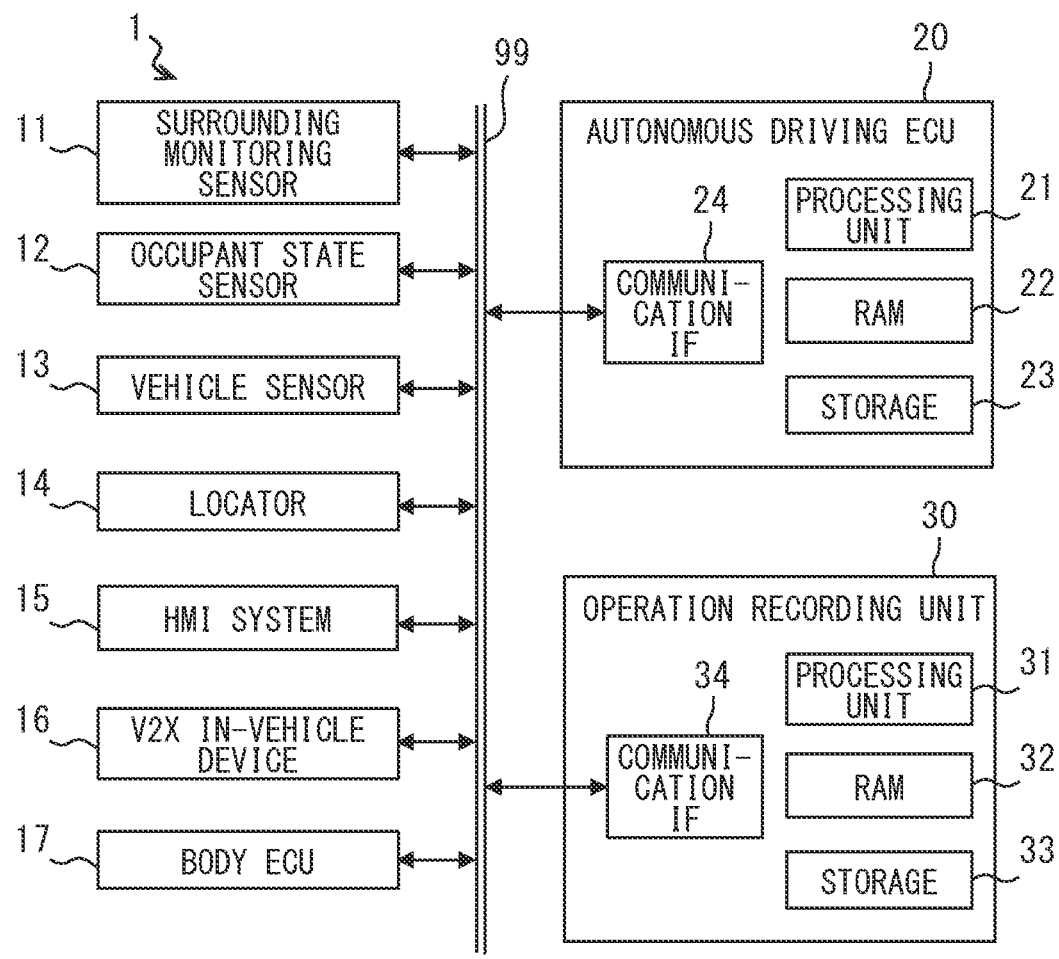
FIG. 1 is a block diagram showing an overall configuration of an autonomous driving system.

Next, a relevant technology will be described first only for understanding the following embodiments. A vehicle having an autonomous driving function is required to be configured to objectively analyze, at a later time, the cause of the occurrence of an accident during autonomous driving, whether the accident responsibility lies with a system or a driver, or the like. Therefore, there is a need to record sensor/ECU data that has not been included in a recording target in the related art. It is assumed that the vehicle having the autonomous driving function will be equipped with even more sensors/ECUs. That is, it is necessary to record more data than ever before. When the related art is directly applied to such demand, an amount of the data to be stored is increased.

The present disclosure is based on this circumstance, and one objective thereof is to provide a vehicle recording device and information recording method capable of improving the analyzability of the cause of an accident while reducing a storage amount of the data.

As described above, according to one aspect of the present disclosure, a vehicle recording device for recording an operation state of an autonomous driving processing unit, which is a computer that is configured to provide an autonomous driving function, the operation state including, as an operating mode, an occupant involvement mode corresponding to any one of autonomous driving levels 0 to 2 and a level 3 mode corresponding to an autonomous driving level 3. The device includes: an information acquisition unit that is configured to acquire a plurality of types of information that can be a recording target from a plurality of sensors mounted in a vehicle; a mode acquisition unit that is configured to acquire a signal indicative of the operating mode of the autonomous driving processing unit; a recording target setting unit that is configured to change the recording target in accordance with the operating mode; and a recording processing unit that is configured to store information of the recording target set by the recording target setting unit into a data storage unit. The plurality of types of information include occupant state data indicative of a state of an occupant in a driver's seat. The information acquisition unit is further configured to acquire a face image of the occupant in the driver's seat as the occupant state data. The recording target setting unit is further configured to: set the face image as the recording target when the autonomous driving processing unit operates in the level 3 mode; and not set the face image as the recording target when the autonomous driving processing unit operates in the occupant involvement mode.

In the above configuration, whether to set, as a recording target, data (for example, a face image) indicating a state of an occupant in a driver's seat is changed in accordance with the driving mode. With such a configuration, the state of the occupant in the driver's seat is not always recorded. For example, in the driving mode in which the occupant in the driver's seat is not responsible for driving, it is possible to exclude the data indicating the state of the occupant in the driver's seat from the recording target. Therefore, the amount of the data to be stored can be reduced. For example, in a predetermined driving mode, the state of the occupant in the driver's seat is recorded, so that the state of the occupant in the driver's seat when the accident has occurred can be specified. As a result, the post-analyzability of the cause of the accident or the responsibility can be improved. That is, with the above configuration, it is possible to improve the analyzability of the cause of the accident while reducing the storage amount of the data.

According to a second aspect of the present disclosure, a vehicle recording device is for recording an operation state of an autonomous driving processing unit, which is a computer that is configured to provide an autonomous driving function. The operation state includes, as an operating mode, an occupant involvement mode corresponding to any one of autonomous driving levels 0 to 2. The device includes: an information acquisition unit that is configured to acquire a plurality of types of information that can be a recording target from a plurality of sensors mounted in a vehicle; a mode acquisition unit that is configured to acquire a signal indicative of the operating mode of the autonomous driving processing unit; a recording target setting unit that is configured to change the recording target in accordance with the operating mode; and a recording processing unit that is configured to store information of the recording target set by the recording target setting unit into a data storage unit. The plurality of types of information include occupant state data indicative of a state of an occupant in a driver's seat. The information acquisition unit is further configured to acquire a face image of the occupant in the driver's seat as the occupant state data. The recording target setting unit is further configured to: set the face image as the recording target when the autonomous driving processing unit executes takeover request processing for requesting the occupant in the driver's seat to take over a driving operation; and not set the face image as the recording target when the autonomous driving processing unit operates in the occupant involvement mode.

According to a third aspect of the present disclosure, an information recording method executed by a processor for recording an operation state of an autonomous driving processing unit, which is a computer that provides an autonomous driving function The operation state includes, as an operating mode, an occupant involvement mode corresponding to any one of autonomous driving levels 0 to 2 and a level 3 mode corresponding to an autonomous driving level 3. The method includes: acquiring a plurality of types of information that can be a recording target from a plurality of sensors mounted in a vehicle and acquiring a signal indicative of the operating mode of the autonomous driving processing unit; changing the recording target in accordance with the operating mode; and storing information of the recording target in a data storage unit. The plurality of types of information include data of a face image of an occupant in a driver's seat. The method further comprises: setting the face image as the recording target when the autonomous driving processing unit operates in the level 3 mode; and not set the face image as the recording target when the autonomous driving processing unit operates in the occupant involvement mode.

With the above configuration, it is possible to improve the analyzability of the cause of the accident while reducing the storage amount of the data by the same action as the vehicle recording device.

Hereinafter, an embodiment of the present disclosure will be described below with reference to the drawings. FIG. 1 is a diagram showing an example of a schematic configuration of an autonomous driving system 1 to which a vehicle recording device of the present disclosure is applied. As shown in FIG. 1, the autonomous driving system 1 includes a surrounding monitoring sensor 11, an occupant state sensor 12, a vehicle state sensor 13, a locator 14, an HMI system 15, a V2X in-vehicle device 16, a body ECU 17, an autonomous driving ECU 20, and an operation recording unit 30. The ECU in the member name is an abbreviation for electronic control unit and means an electronic control device. The HMI is an abbreviation for human machine interface. The V2X is an abbreviation for vehicle to x (everything) and refers to a communication technology that connects various things to a vehicle. When simply described as a system, it shall refer to the autonomous driving system 1.

The various devices or sensors constituting the autonomous driving system 1 are connected as nodes to a communication network (hereinafter, local area network: LAN) 99 constructed in a vehicle. These nodes connected to the LAN 99 can communicate with each other. The specific devices may be configured to communicate directly with each other without going through the LAN 99. For example, the autonomous driving ECU 20 and the operation recording unit 30 may be directly electrically connected by a dedicated line. In FIG. 1, the LAN 99 is configured as a bus type, but the LAN 99 is not limited to this. The network topology may be a mesh type, a star type, a ring type, or the like. A network shape can be changed as appropriate. As a standard of the LAN 99, various standards, such as controller area network (hereinafter, CAN: registered trademark), Ethernet (Ethernet is a registered trademark), or FlexRay (registered trademark), can be adopted.

Hereinafter, a vehicle on which the autonomous driving system 1 is mounted is also described as a subject vehicle, and an occupant seated in a driver's seat of the subject vehicle (that is, occupant in the driver's seat) is also described as a user. In the following description, each of longitudinal, lateral, and vertical directions is defined with reference to the subject vehicle. Specifically, the longitudinal direction corresponds to a longitudinal direction of the subject vehicle. The lateral direction corresponds to a width direction of the subject vehicle. The vertical direction corresponds to a vehicle height direction. From another viewpoint, the vertical direction is defined along a vertical direction of a horizontal plane that defines the longitudinal direction and the lateral direction.

<Overview of Each Component>

The surrounding monitoring sensor 11 is a device that collects information on an external environment around the subject vehicle. As the surrounding monitoring sensor 11, for example, a camera, a millimeter wave radar, a light detection and ranging/laser imaging detection and ranging (LiDAR), or a sonar can be adopted. The millimeter wave radar is a device that detects a relative position or a relative speed of an object with respect to the subject vehicle by transmitting millimeter waves or quasi-millimeter waves in a predetermined direction and analyzing reception data of reflected waves returned by the transmission waves reflected by the object. As a detection result, the millimeter wave radar generates data indicating, for example, the reception strength and the relative speed for each detection direction and distance, or data indicating the relative position and reception strength of a detected object. The LiDAR is a device that generates three-dimensional point cloud data indicating a position of a reflection point in each detection direction by emitting laser light.

Figure 2:
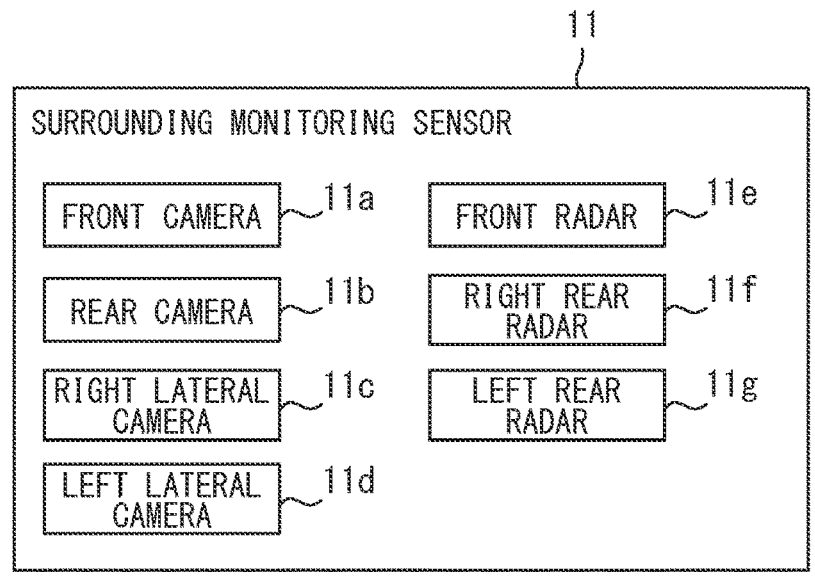
FIG. 2 is a diagram showing an example of a surrounding monitoring sensor.

Here, as an example, as shown in FIG. 2, the autonomous driving system 1 includes, as the surrounding monitoring sensors 11, a front camera 11*a*, a rear camera 11*b*, a right lateral camera 11*c*, a left lateral camera 11*d*, a front radar 11*e*, a right rear radar 11*f*, and a left rear radar 11*g*. The front camera 11*a*, the rear camera 11*b*, the right lateral camera 11*c*, and the left lateral camera 11*d* can also be referred to as surrounding monitoring cameras.

The front camera 11*a* is a camera that images the front side of the vehicle at a predetermined angle of view. The front camera 11*a* is disposed, for example, at an upper end portion of a front windshield on a vehicle interior side, or a front grille. As the front camera 11*a*, a surrounding monitoring camera configured to image relatively wide angle and short distance may be provided in addition to a camera disposed in the upper end portion of the front windshield on the vehicle interior side configured to image a relatively long distance. The rear camera 11*b* is a camera that images the rear side of the vehicle at a predetermined angle of view. The rear camera 11*b* is disposed at a predetermined position on a body back surface portion, for example, in the vicinity of a rear license plate or in the vicinity of a rear window. In the description of the mounting position of the surrounding monitoring sensor 11, the "vicinity" of a certain member means a range within, for example, 30 cm from the member. For example, the vicinity of the license plate means a range within 30 cm from the license plate. The right lateral camera 11*c* and the left lateral camera 11*d* are cameras that image the lateral side of the vehicle at a predetermined angle of view, and are disposed at predetermined positions on side mirrors or left and right side surfaces of the body (for example, in the vicinity of a base of an A pillar).

The front radar 11*e* is a millimeter wave radar of which a detection range is a predetermined range in the front side of the vehicle by transmitting probe waves toward the front side of the vehicle, and is installed in, for example, a front grille or a front bumper. The right rear radar 11*f* is a millimeter wave radar of which a detection range is a predetermined range on the right rear side of the vehicle by transmitting probe waves toward the right rear side of the vehicle, and is installed in, for example, a right corner of a rear bumper. The left rear radar 11*g* is a millimeter wave radar of which a detection range is a predetermined range on the left rear side of the vehicle by transmitting probe waves toward the left rear side of the vehicle, and is installed in, for example, a left corner of the rear bumper.

The various surrounding monitoring sensors 11 described above detect, for example, a predetermined detection target object and specify the relative position of the detected object with respect to the subject vehicle. Then, detection result data indicating a position or a type of the detected object is sequentially provided to the autonomous driving ECU 20 and the operation recording unit 30 (hereinafter, the autonomous driving ECU 20 and the like). The detection target object here is, for example, a pedestrian, an animal other than a human being, other vehicles, or a structure installed along a road. Other vehicles include a bicycle, a motorized bicycle, or a motorcycle. The structure installed along the road is, for example, a guard rail, a curb, a tree, a utility pole, a traffic sign, or a traffic light. In the present embodiment, as a more preferable aspect, it is assumed that a road surface sign, such as a traveling lane marking or a falling object on the road, is also registered as the detection target object of the surrounding monitoring camera.

The surrounding monitoring sensor 11 also provides observation data used for object recognition, such as image data, to the autonomous driving ECU 20 and the like via the LAN 99. For example, the front camera 11*a* outputs the image data as the observation data obtained by imaging the front side of the vehicle and an analysis result of the image data. The observation data of the millimeter wave radar refers to the data indicating the reception strength and the relative speed for each detection direction and distance, or the data indicating the relative position and reception strength of the detected object. The observation data of an ultrasonic sensor refers to a distance measurement result. The observation data of the LiDAR is the three-dimensional point cloud data. The observation data corresponds to unprocessed data observed by the sensor or data before recognition processing is executed.

Object recognition processing based on the observation data may be executed by the ECU outside the sensor, such as the autonomous driving ECU 20. In that case, the camera or millimeter wave radar as the surrounding monitoring sensor 11 need only provide the observation data, such as the image data or the distance measurement data, to the autonomous driving ECU 20 as detection result data. The various surrounding monitoring sensors 11 output an error signal to the LAN 99 when an internal failure or the like occurs. For example, the front camera 11*a* outputs the error signal when an abnormality in an image pickup device or a processing circuit is detected.

Figure 3:
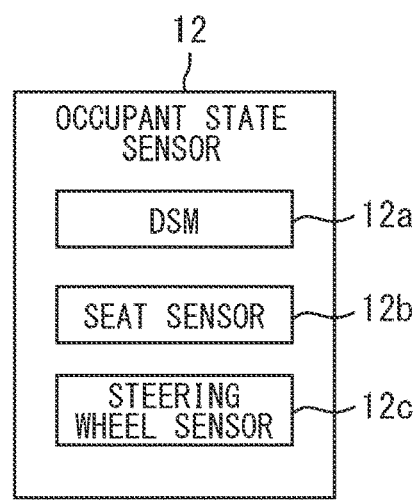
FIG. 3 is a diagram showing an example of an occupant state sensor.

The occupant state sensor 12 is a sensor that sequentially detects index information indicating a state of the occupant in the driver's seat. As the index information indicating the state of the occupant in the driver's seat, a face image or an upper body image of the occupant in the driver's seat, a distribution of a pressure acting on a seating surface of the driver's seat, a gripping state of a steering wheel, and the like can be adopted. Biometric information, such as a heart rate, a respiratory interval, and an electroencephalogram, can also be adopted as the index information indicating the state of the occupant in the driver's seat. For example, the autonomous driving system 1 includes a driver status monitor (hereinafter, DSM) 12*a*, a seat sensor 12*b*, and a steering wheel sensor 12*c* as the occupant state sensor 12, as shown in FIG. 3. The autonomous driving system 1 does not have to include all of these sensors. A sensor other than these sensors may be provided as the occupant state sensor 12. For example, a wristwatch-type wearable device that measures a body temperature or a pulse may be provided as the occupant state sensor 12.

The DSM 12*a* sequentially detects the state of the occupant in the driver's seat based on the face image of the occupant in the driver's seat. Specifically, the DSM 12*a* images the face of the occupant in the driver's seat using a near-infrared camera, and executes image recognition processing on the captured image to sequentially detect a face direction or a sight line direction of the occupant in the driver's seat, a degree of eyelid opening, and the like. The DSM 12*a* is disposed on an upper surface of a steering column cover, an upper surface of an instrument panel, an inner rearview mirror, or the like, for example, in a posture in which the near-infrared camera is directed a headrest portion of the driver's seat such that the face of the occupant seated in the driver's seat can be imaged.

The captured image by the near-infrared camera is subjected to image analysis by a control unit (not shown). The control unit of the DSM 12*a* estimates a degree of arousal of the occupant in the driver's seat by comprehensively considering the face direction or the sight line direction, the degree of eyelid opening, a frequency or an interval of blinking, and the like. The DSM 12*a* sequentially outputs information indicating the face direction of the occupant in the driver's seat, the sight line direction, the degree of eyelid opening, the degree of arousal, or the like specified from the captured image to the LAN 99 as occupant state data. In the present embodiment, as a more preferable aspect, the DSM 12*a* provides face image data of the occupant in the driver's seat to the autonomous driving ECU 20 and the like. The face image data of the occupant in the driver's seat is a material for determining the degree of arousal of the occupant in the driver's seat or the like, and corresponds to the observation data of the near-infrared camera constituting the DSM 12*a*. The autonomous driving ECU 20 may have a function of analyzing the captured image by the near-infrared camera. In that case, the DSM 12*a* need only be configured to output the captured image by the near-infrared camera. The image data may be output in a format of an image signal.

The seat sensor 12*b* sequentially detects the state of the occupant in the driver's seat based on the distribution of the pressure acting on a backrest portion or the seating surface of the driver's seat. An output signal of the seat sensor 12*b* can be used as a material for estimating whether the occupant in the driver's seat is seated in a driving posture. The seat sensor 12*b* is embedded inside a surface of the backrest portion and a seating portion of the driver's seat. The steering wheel sensor 12*c* is provided on the steering wheel and detects a pressure at which the driver grips the steering wheel. The steering wheel sensor 12*c* may be a capacitive type sensor that detects that the occupant grips the steering wheel based on a change in capacitance. The steering wheel sensor 12*c* may detect a torque acting on the steering wheel (for example, a torsion bar). The torque applied to the steering wheel indicates that the user grips the steering wheel. An output signal of the steering wheel sensor 12*c* can be used as a signal indicating whether the driver grips the steering wheel with both hands. Detection results of the seat sensor 12*b* and the steering wheel sensor 12*c* are provided to the autonomous driving ECU 20 and the like via, for example, the LAN 99.

The vehicle state sensor 13 is a sensor that detects a state amount related to traveling control of the subject vehicle. The vehicle state sensor 13 includes a brake sensor, an accelerator sensor, a shift position sensor, a steering angle sensor, a vehicle speed sensor, a turning angle sensor, an acceleration sensor, and the like. The brake sensor is a sensor that detects a position of a brake pedal, in other words, an amount of depression of the brake pedal by the occupant in the driver's seat (hereinafter, referred to as brake depression amount). The accelerator sensor is a sensor that detects a position of an accelerator pedal, in other words, an amount of depression of the accelerator pedal by the occupant in the driver's seat (hereinafter, referred to as accelerator depression amount). The shift position sensor is a sensor that detects a position of a shift lever. The steering angle sensor is a sensor that detects a rotation angle of the steering wheel (so-called steering angle). The brake sensor, the accelerator sensor, the shift position sensor, and the steering angle sensor correspond to sensors that detect a physical state amount indicating a content of a driving operation by the occupant in the driver's seat.

The vehicle speed sensor is a sensor that detects a traveling speed of the subject vehicle. The turning angle sensor is a sensor that detects a tire angle (so-called turning angle) in the vehicle longitudinal direction or with respect to an axle. The acceleration sensor is a sensor that detects acceleration in the vehicle longitudinal direction or the acceleration in a lateral direction acting on the subject vehicle. The vehicle speed sensor, the turning angle sensor, and the acceleration sensor correspond to sensors that detect a physical state amount indicating behavior of the vehicle resulting from the driving operation of the occupant in the driver's seat or the control by the autonomous driving ECU 20.

Each sensor outputs data indicating a current value (that is, the detection result) of the physical state amount, which is the detection target, to the LAN 99. The output data of each sensor is acquired by the autonomous driving ECU 20 and the like via the LAN 99. A type of the sensor used by the autonomous driving system 1 as the vehicle state sensor 13 need only be designed as appropriate, and it is not necessary to include all the sensors described above. The autonomous driving system 1 may include sensors other than the sensors described above, such as a yaw rate sensor, an azimuth sensor, or an engine rotation speed sensor, as the vehicle state sensor 13. The yaw rate sensor is a sensor that detects a rotational angular velocity (that is, yaw rate) around a vertical axis of the subject vehicle. The azimuth sensor is a sensor that detects an azimuth angle that the subject vehicle faces. The engine rotation speed sensor is a sensor that detects a rotation speed of an engine. When the subject vehicle is a vehicle including a motor as a driving source, a sensor that detects the rotation speed/output torque of the motor may be provided.

Figure 4:
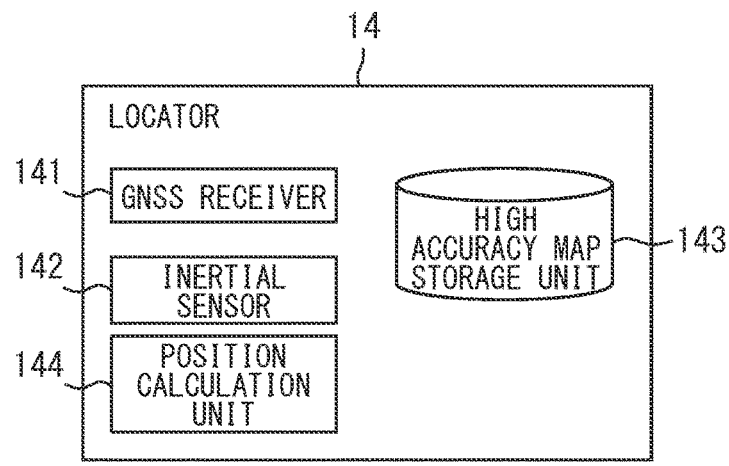
FIG. 4 is a block diagram showing a configuration of a locator.

The locator 14 is a device that generates highly accurate position information and the like of the subject vehicle by complex positioning that combines multiple pieces of information. As shown in FIG. 4, for example, the locator 14 is implemented by using a GNSS receiver 141, an inertial sensor 142, a high accuracy map database 143 (hereinafter, the database is referred to as DB), and a position calculation unit 144. The GNSS receiver 141 is a device that sequentially (for example, each 100 milliseconds) detects a current position of the GNSS receiver 141 by receiving a navigation signal transmitted from a positioning satellite constituting a global navigation satellite system (GNSS). As the GNSS, a GPS, a GLONASS, a Galileo, an IRNSS, a QZSS, a Beidou, and the like can be adopted. The inertial sensor 142 is, for example, a three-axis gyro sensor and a three-axis acceleration sensor.

The high accuracy map DB 143 is a non-volatile memory that stores high accuracy map data. The high accuracy map data here corresponds to map data indicating a road structure, a position coordinate of a planimetric feature disposed along the road, and the like with the accuracy that can be used for autonomous driving. The high accuracy map data includes, for example, three-dimensional shape data of the road, lane data, or planimetric feature data. The three-dimensional shape data of the road described above includes node data related to a point (hereinafter, referred to as node) at which multiple roads intersect, merge, or branch, and link data related to a road connecting the points (hereinafter, referred to as link). The link data also includes data indicating a road type, such as whether it is a motorway or a general road. The motorway here refers to a road on which the pedestrian or the bicycle is prohibited from entering, such as a toll road such as an expressway. The road type may include attribute information indicating whether autonomous traveling is allowed in the road. The lane data indicates the number of lanes, a laying position coordinate of a lane marking (so-called lane marker), a traveling direction for each lane, or branch/merging points at a lane level. The lane marker includes a road stud in addition to a paint provided in a dashed line or a continuous line using a yellow or white paint. The planimetric feature data includes position and type information of the road surface display, such as a stop line, or position, shape, and type information of a landmark. The landmark includes a three-dimensional structure installed along the road, such as the traffic sign, the traffic light, a pole, and a commercial sign.

The position calculation unit 144 sequentially positions the position of the subject vehicle by combining a positioning result of the GNSS receiver 141 and a measurement result of the inertial sensor 142. The positioned vehicle position is output to the LAN 99 and used by the autonomous driving ECU 20 and the like. The locator 14 reads the map data in a predetermined range determined based on the current position from the high accuracy map DB 143 and provides the read map data to the autonomous driving ECU 20 and the like via the LAN 99. A configuration may be adopted in which the map data is acquired from an external server or the like via the V2X in-vehicle device 16. Further, the locator 14 (mainly the position calculation unit 144) may be configured to execute localization processing. The localization processing refers to processing of specifying a detailed position of the subject vehicle by collating a coordinate of the landmark specified based on the image captured by the surrounding monitoring camera, such as the front camera 11a, and a coordinate of the landmark registered in the high accuracy map data. Some or all the functions of the locator 14 may be provided in the autonomous driving ECU 20.

Figure 5:
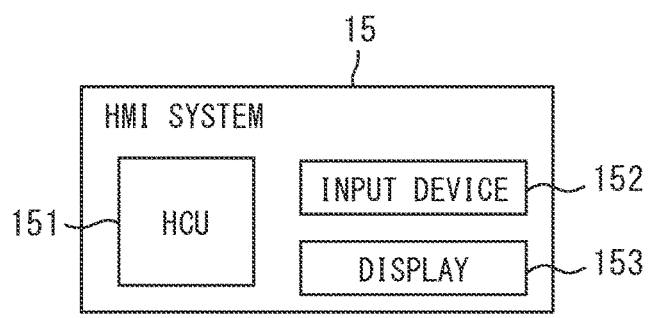
FIG. 5 is a block diagram showing a configuration of an HMI system.

The HMI system 15 is a system that provides an input interface function of receiving a user operation and an output interface function of presenting information to the user. As shown in FIG. 5, the HMI system 15 includes an HMI control unit (HCU) 151, an input device 152, and a display 153.

The HCU 151 is configured to integrally control the acquisition of manipulation information input by the user via the input device 152 and the information presentation to the user using the display 153. The information presentation to the user may be implemented by using a speaker, a vibrator, an illumination device (for example, LED), or the like. The HCU 151 is implemented by using, for example, a processor, such as a CPU or a GPU, a RAM, and a flash memory. Details of the HCU 151 will be described after the input device 152 and the display 153 are described.

The input device 152 is a device that receives an instruction operation of the user with respect to various electronic devices (hereinafter, in-vehicle devices) mounted on the subject vehicle, such as a navigation apparatus. The in-vehicle device here also includes the autonomous driving ECU 20 or the operation recording unit 30. In the present embodiment, as an example, the HMI system 15 includes a mechanical switch (that is, a steering switch) provided in the steering wheel or the like as the input device 152. The HMI system 15 includes the input device 152 that functions as a driving mode switch. The driving mode switch is a switch for operating and stopping an autonomous driving function. Such a driving mode switch corresponds to a switch for the occupant in the driver's seat to switch the driving mode. The input device 152 may be a touch panel laminated on a surface of the display 153, or may be a speech input device implemented by using various speech recognition technologies. The input device 152 may also be a haptic device disposed on a center console. The vehicle control system 100 may include the multiple types of devices described above as the input device 152.

The display 153 is a device that displays an image input from the HCU 151. In the present embodiment, as an example, the display 153 is a display (so-called center display) provided at an uppermost portion of the instrument panel in a center portion in the vehicle width direction (hereinafter, referred to as center region). The display 153 is capable of full-color display, and can be implemented by using a liquid crystal display, an organic light emitting diode (OLED) display, a plasma display, or the like. The HMI system 15 may include a head-up display as the display 153, which projects a virtual image on a part of the front windshield in the front side of the driver's seat. The display 153 may be a display (so-called meter display) disposed in a region positioned in the front side of the driver's seat in the instrument panel.

Figure 6:
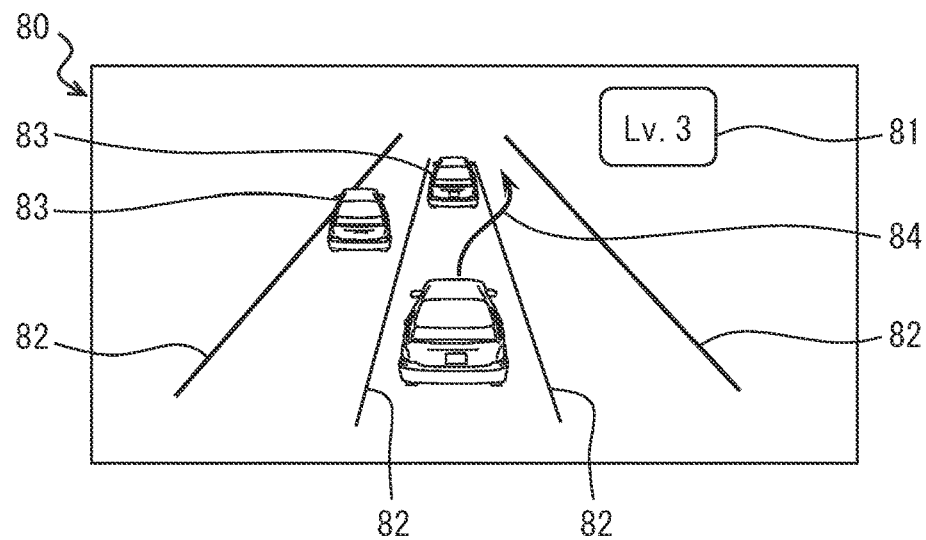
FIG. 6 is a diagram showing an example of a driving mode notification image.

Based on the information provided by the autonomous driving ECU 20, the HCU 151 displays an image showing an operation state of the autonomous driving function (hereinafter, driving mode notification image 80) on the display 153. For example, as shown in FIG. 6, the driving mode notification image 80 may include a mode icon image 81, a road surface recognition state image 82, and a moving object recognition state image 83. The mode icon image 81 is an image clearly indicating the driving mode. The road surface recognition state image 82 is an image showing a recognition state of the lane marking or a road edge in the autonomous driving ECU 20. The moving object recognition state image 83 is an image showing recognition states of other moving objects in the autonomous driving ECU 20. A scheduled action notification image 84 is an image showing the next scheduled action of the autonomous driving ECU 20. The HCU 151 may express whether the lane marking or the road edge can be recognized, for example, by changing a display mode (for example, color) of a line image constituting the road surface recognition state image 82. The same applies to the moving object recognition state image 83. When the HCU 151 requests the occupant in the driver's seat to take over the driving operation in a predetermined notification mode using an image, light, or sound when transferring the authority of the driving operation to the occupant in the driver's seat (so-called takeover request) from the autonomous driving system 1.

The HCU 151 provides a screenshot of a display screen of the display 153 based on a request from the operation recording unit 30. The HCU 151 sequentially provides data indicating a notification state to the occupant regarding the driving mode to the operation recording unit 30. Elements constituting the notification state to the occupant regarding the driving mode can include a content (for example, image ID) displayed on the display 153 as an image indicating the driving mode, and a data ID and volume of a message or warning sound output from the speaker.

The V2X in-vehicle device 16 is a device for the subject vehicle to execute wireless communication with other devices. The "V" of V2X may refer to an automobile as the subject vehicle, and the "X" may refer to various presences other than the subject vehicle, such as the pedestrian, other vehicles, a road facility, the network, or the server. The V2X in-vehicle device 16 includes a wide area communication unit and a short range communication unit as communication modules. The wide area communication unit is a communication module for executing wireless communication compliant with a predetermined wide area wireless communication standard. As the wide area wireless communication standard here, various standards, such as long term evolution (LTE), 4G, or 5G, can be adopted. The wide area communication unit may be configured to execute wireless communication directly with other devices (in other words, without going through the base station) by a method compliant with the wide area wireless communication standard, in addition to communication via a wireless base station. That is, the wide area communication unit may be configured to execute cellular V2X. The subject vehicle is a connected car that can be connected to the Internet by mounting the V2X in-vehicle device 16. For example, the locator 14 can download the latest map data from a predetermined server in cooperation with the V2X in-vehicle device 16 and update the map data stored in the high accuracy map DB 143.

The short range communication unit provided in the V2X in-vehicle device 16 is the communication module for executing wireless communication directly with other moving objects or a roadside device present around the subject vehicle by the communication standard (hereinafter, referred to as short range communication standard) of which a communication distance is limited to several tens of meters to several hundreds of meters. The other moving objects are not limited to the vehicle, but may include the pedestrian, the bicycle, and the like. As the short range communication standard, any standard, such as a wireless access in vehicular environment (WAVE) standard disclosed in IEEE1609 and a dedicated short range communications (DSRC) standard, can be adopted.

The body ECU 17 is an ECU that integrally controls body-based in-vehicle devices mounted on the vehicle. The body-based in-vehicle devices include a lighting device, such as a headlight or a direction indicator, a side mirror motor that changes an angle of a side mirror, a window motor that opens and closes a window, a door lock motor, a windshield wiper blade motor, and the like. The body ECU 17 controls a turning-on state of the headlights based on, for example, an operation of a light switch by the occupant in the driver's seat, a detection value of an illuminance sensor, or an instruction from the autonomous driving ECU 20. The body ECU 17 outputs various signals indicating an operation state of the lighting device, such as the headlight and the direction indicator, an operation state of the windshield wiper, and the opening/closing and locked state of the door to the LAN 99. When the subject vehicle includes a driving mode notification light that is lighting equipment that notifies the outside, such as the pedestrian or the like, of the driving mode (for example, that the subject vehicle autonomously travels), the driving mode notification light can also be included in the body-based in-vehicle device.

The autonomous driving ECU 20 is an ECU that executes a part or all of the driving operation on behalf of the occupant in the driver's seat by controlling traveling actuators (hereinafter, referred to as traveling actuator 18) based on the detection result of the surrounding monitoring sensor 11 and the like. The autonomous driving ECU 20 corresponds to an autonomous driving device that provides the autonomous driving function. The traveling actuator 18 includes, for example, a braking device (so-called brake actuator), an electronic throttle, or a steering actuator. The traveling actuator 18 is a hardware element related to at least one of acceleration, deceleration, and steering of the vehicle.

The concept of autonomous driving here is not limited to an aspect in which all the operations related to the traveling of the vehicle are automatically executed, and an aspect in which a part of the driving operation is automatically executed can also be included. That is, the control from autonomous driving level 1 to level 2 defined by the Society of Automotive Engineers (SAE International) can also be included. The autonomous driving level can be referred to as an automation level. The autonomous driving level 1 refers to a level at which the system supports any one of the steering operation and the acceleration and deceleration operation, and the autonomous driving level 2 refers to a level at which the system supports multiple operations of the steering operation and the acceleration and deceleration operation. The autonomous driving level 3 refers to a level at which the system executes all the driving operations in an operational design domain (ODD) that defines a condition that autonomous driving is executable (that is, autonomous driving permission condition), but operation authority is transferred from the system to the driver in an emergency. The level 4 refers to a level at which the system executes all driving operations inside the ODD. The level 5 refers to a level at which the system executes all driving operations without limitation of place. The level 3 or higher corresponds to an autonomous traveling level at which all controls related to the traveling of the vehicle are automatically executed.

Here, as an example, the autonomous driving ECU 20 is configured to be able to execute up to the autonomous driving level 5, and is configured to be able to switch the operation mode corresponding to each automation level.

Hereinafter, for convenience, the operation mode corresponding to the autonomous driving level N (N=0 to 5) will be referred to as a level N mode. For example, a level 3 mode refers to an operation mode in which the subject vehicle is caused to autonomously travel at the autonomous driving level 3. In the present specification, the level 3 to 5 modes are also referred to as an autonomous driving mode, and the level 1 to 2 modes are referred to as a driver-assistance mode. The level 0 to 2 modes correspond to an occupant involvement mode in which at least a part of the driving operation is left to the occupant in the driver's seat. The operation mode of the autonomous driving ECU 20 corresponds to the driving mode from the viewpoint of the occupant.

The switching of the operation mode is automatically executed due to a system limit, an exit from the ODD, and the like, in addition to the user operation. In the autonomous driving mode, the autonomous driving ECU 20 automatically executes steering, acceleration, and deceleration (in other words, braking) of the vehicle such that the subject vehicle travels along the road to a destination set by the occupant in the driver's seat or an operator.

The autonomous driving ECU 20 mainly includes a computer including a processing unit 21, a RAM 22, a storage 23, a communication interface 24, a bus connecting these, and the like. The processing unit 21 is hardware for calculation processing combined with the RAM 22. The processing unit 21 includes at least one calculation core, such as a central processing unit (CPU). The processing unit 21 executes various processing of realizing a function of each functional unit, which will be described later, by accessing the RAM 22. The storage 23 includes a non-volatile storage medium, such as a flash memory. The storage 23 stores a program executed by the processing unit 21 (hereinafter, referred to as autonomous driving program). Executing the autonomous driving program by the processing unit 21 corresponds to executing a method corresponding to the autonomous driving program. The communication interface 24 is a circuit for communicating with other devices via the LAN 99. The communication interface 24 need only be implemented by using an analog circuit element, an IC, or the like. The details of the autonomous driving ECU 20 will be described later.

The operation recording unit 30 is a device that records data indicating at least either one of a status inside the vehicle and a status outside the vehicle when the vehicle travels. The status of the vehicle interior when the vehicle travels can include the operation state of the autonomous driving ECU 20 or the state of the occupant in the driver's seat. Further, the data indicating the operation state of the autonomous driving ECU 20 also includes the recognition result of the surrounding environment in the autonomous driving ECU 20, a travel plan, a calculation result of a target control amount of each traveling actuator, or the like. The data, which is the recording target, is acquired from the ECU or sensor mounted on the vehicle, such as the autonomous driving ECU 20 or the surrounding monitoring sensor 11, via the LAN 99 and the like.

The operation recording unit 30 also mainly includes a computer including a processing unit 31, a RAM 32, a storage 33, a communication interface 34, a bus connecting these, and the like. The processing unit 31 is hardware for calculation processing combined with the RAM 32. The processing unit 31 includes at least one processor, such as a CPU. The processing unit 31 executes various processing of realizing a function of each functional unit, which will be described later, by accessing the RAM 32. The storage 33 includes a non-volatile storage medium, such as a flash memory. The storage 33 stores a program executed by the processing unit 31 (hereinafter, an operation status recording program). Executing the operation status recording program by the processing unit 31 corresponds to executing a method (corresponding to an information recording method) corresponding to the operation status recording program. The communication interface 34 is a circuit for connecting to the LAN 99 and communicating with other devices via the LAN 99. The communication interface 34 is implemented by using an analog circuit element, an IC, or the like. Details of the operation recording unit 30 will be described later.

<About Autonomous Driving ECU 20>

Figure 7:
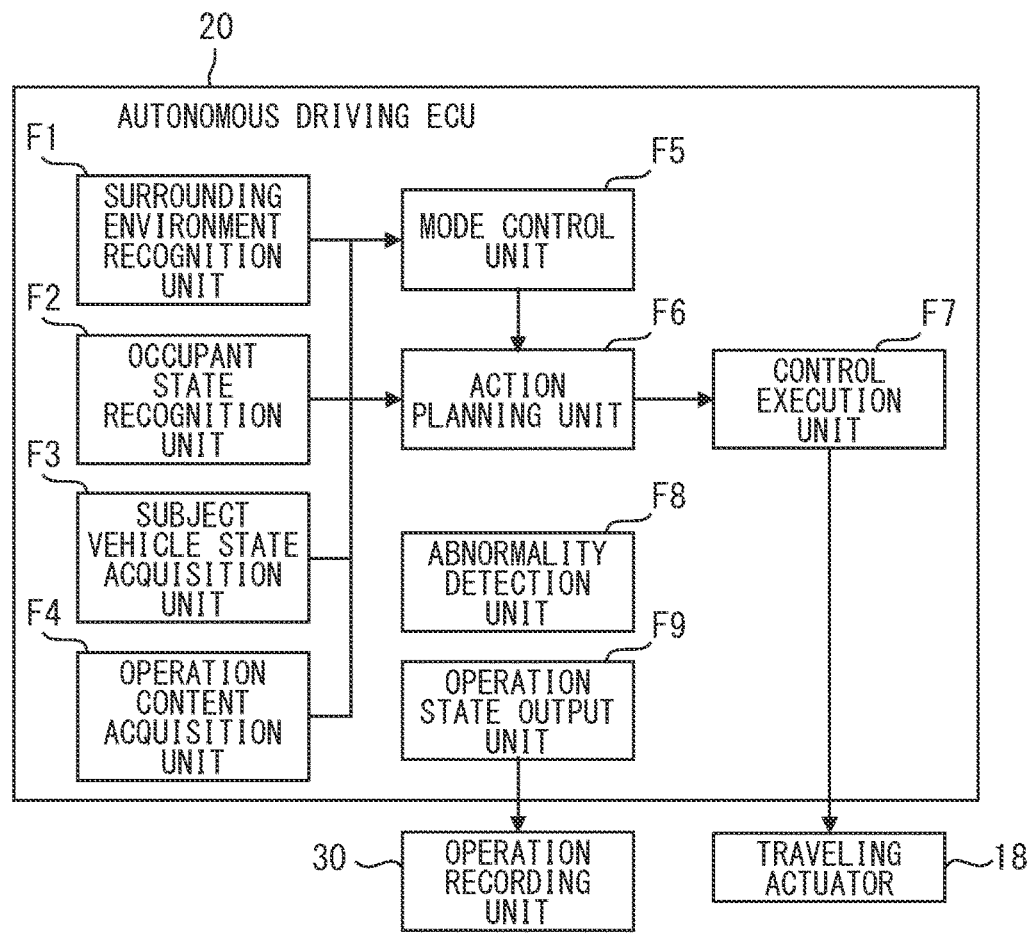
FIG. 7 is a block diagram showing a configuration of an autonomous driving ECU.

Here, the function and the operation of the autonomous driving ECU 20 will be described with reference to FIG. 7. The autonomous driving ECU 20 provides functions corresponding to various functional blocks shown in FIG. 7 by executing the autonomous driving program stored in the storage 23. That is, the autonomous driving ECU 20 includes, as the functional blocks, a surrounding environment recognition unit F1, an occupant state recognition unit F2, a subject vehicle state acquisition unit F3, an operation content acquisition unit F4, a mode control unit F5, an action planning unit F6, a control execution unit F7, an abnormality detection unit F8, and an operation state output unit F9.

The surrounding environment recognition unit F1 recognizes the surrounding environment, which is the environment around the subject vehicle, based on the detection result of the surrounding monitoring sensor 11. The surrounding environment here includes a dynamic environmental factor, such as positions or travel speeds of other moving objects, weather, and brightness, the temperature, in addition to a static environmental element, such as the current position, the traveling lane, the road type, the speed limit, or the relative position of the planimetric features. Other moving objects include automobiles as other vehicles, the pedestrian, the bicycle, or the like.

For example, the surrounding environment recognition unit F1 acquires latest subject vehicle position and traveling direction, and the high accuracy map data of a surrounding range of a subject vehicle A from the locator 14. The surrounding environment recognition unit F1 acquires the detection result from each of the multiple surrounding monitoring sensors 11 and complementarily combines (that is, fuses) the detection results to recognize the position and type of the object present around the subject vehicle. That is, an environment recognition result of the autonomous driving ECU 20 also includes the recognition result of the object present around the subject vehicle. The object, which is a recognition target, includes the planimetric feature or the moving object. The recognition result of the object can include the position, the type, the travel speed, or the like of the detected object. The position or the speed may be the relative position and the relative speed with respect to the subject vehicle, or may be an absolute position and an absolute speed with respect to the ground.

The surrounding environment recognition unit F1 evaluates a probability of collision with the object present around the subject vehicle. As an index showing the probability of collision, a remaining collision time (so-called time-to-collision: TTC), a collision margin (margin-to-collision: MTC), an inter-vehicle time (THW: time-head way), and the like can be adopted. The concept of the TTC also includes using the acceleration or jerk of at least either one of the subject vehicle and other vehicles. The surrounding environment recognition unit F1 recognizes the position or the type of the road surface sign or the sign around the subject vehicle, and the turning-on state of the traffic light based on the detection result of the surrounding monitoring sensor 11 or the high accuracy map data.

The surrounding environment recognition unit F1 specifies, as boundary information related to a boundary of a track, the relative positions and the shapes of the left and right lane markings or road edges of the lane on which the subject vehicle currently travels, by using at least either one of the detection result of the surrounding monitoring sensor 11 and the high accuracy map data. The data acquired by the surrounding environment recognition unit F1 from each surrounding monitoring sensor 11 may be the observation data, such as the image data, instead of the analysis result. In that case, the surrounding environment recognition unit F1 need only specify the surrounding environment including the positions or shapes of the left and right lane markings or road edges based on the observation data of various surrounding monitoring sensors 11.

The surrounding environment recognition unit F1 may specify the surrounding environment by using other-vehicle information received by the V2X in-vehicle device 16 from other vehicles, traffic information received from the roadside device in road-to-vehicle communication, weather information received from the server, or the like.

The occupant state recognition unit F2 determines the state of the occupant in the driver's seat based on the information provided from the occupant state sensor 12. For example, the occupant state recognition unit F2 determines the degree of arousal of the occupant in the driver's seat based on the data provided by the DSM 12a. The degree of arousal may be evaluated in two stages depending on whether the occupant in the driver's seat is an arousal state, or may be evaluated separately in three or more stages. The occupant state recognition unit F2 determines whether the occupant in the driver's seat is in a forward gaze state looking ahead of the vehicle based on the data provided from the DSM 12a. For example, the occupant state recognition unit F2 determines that the occupant in the driver's seat is in the forward gaze state when the degree of eyelid opening is equal to or greater than a predetermined threshold and the sight line direction of the occupant in the driver's seat is directed to the front side of the vehicle. In the present specification, the forward gaze state is also referred to as eyes on, and a non-forward gaze state is also referred to as eyes off. The degree of arousal or eyes on/off may be determined by combining sensing information of multiple types of sensors, such as the DSM 12a and the seat sensor 12b.

Further, the occupant state recognition unit F2 determines whether the occupant in the driver's seat is in a steering wheel gripping state of gripping the steering wheel based on the output signal of the steering wheel sensor 12c. For example, when the steering wheel sensor 12c detects a change in pressure or capacitance equal to or greater than a predetermined threshold, it is determined that the occupant in the driver's seat is in the steering wheel gripping state. In the present specification, the steering wheel gripping state is also referred to as hands on, and a non-steering wheel gripping state is also referred to as hands off.

The occupant state recognition unit F2 may be configured to determine whether the occupant in the driver's seat is a dead-man state based on at least the output signals of the DSM 12a and the seat sensor 12b. The dead-man state refers to a state in which it is difficult to return to a state in which normal driving is possible due to a sudden change in physical condition, such as a stroke. As a material for determining whether the occupant in the driver's seat is the dead-man state, the posture or pulse of the occupant in the driver's seat, the presence or absence of a degree of pupil opening, the behavior of the vehicle, and the like can be adopted.

The subject vehicle state acquisition unit F3 recognizes the state of the subject vehicle based on the output data of the vehicle state sensor 13 and the body ECU 17. The state of the subject vehicle includes the vehicle speed, the acceleration, the yaw rate, the shift position, the engine rotation speed, the turning angle, or the like. The subject vehicle state acquisition unit F3 acquires the operation state of the body-based in-vehicle device based on an output signal of the body ECU 17. For example, the subject vehicle state acquisition unit F3 acquires data indicating the operation state of the direction indicator, the turning-on state of the headlamp, the operation state of the windshield wiper, or the like by communicating with the body ECU 17.

Based on the output signals (in other words, operation signals) from the pedal, the lever, the switch, or the input device 152 provided in the vehicle, the operation content acquisition unit F4 detects the presence or absence/operation amount of the operation with respect to these operation members by the occupant in the driver's seat. For example, the operation content acquisition unit F4 acquires an operation content with respect to the autonomous driving switch by the occupant, the brake depression amount, or the like.

The mode control unit F5 switches the driving mode based on at least one of the surrounding environment, the occupant state, the subject vehicle state, and the user operation. For example, the mode control unit F5 switches the driving mode based on the user operation. For example, when the user operation of executing transition to the level 3 mode is received via the input device 152 during the operation in the mode of the level 2 or lower, the mode control unit F5 transitions to the level 3 mode on a condition that it is the surrounding environment in which the autonomous driving level 3 is executable. The same applies to the transition from the mode of the level 2 or lower to the level 4 mode. Whether it is the surrounding environment in which the autonomous driving levels 3 to 4 are executable need only be determined based on the recognition result of the surrounding environment recognition unit F1. For example, when the recognition result of the surrounding environment satisfies the ODD defined for the subject vehicle, it can be determined that it is the surrounding environment in which the autonomous driving levels 3 to 4 are executable. When the mode control unit F5 receives the user operation of executing transition to the level 5 mode via the input device 152, for example, during the operation in the mode of the level 2 or lower, the mode control unit F5 switches the operation mode to the level 5 mode.

On the other hand, when it is difficult to maintain the autonomous driving mode during traveling in the autonomous driving mode, the mode transitions to the level 2 mode with authority transfer processing. The case in which the autonomous driving mode cannot be maintained is a case in which the ODD is not satisfied due to a sensor failure, a dynamic environmental factor, or the like, or a case in which the vehicle deviates from a road segment designed as the ODD.

The authority transfer processing is processing of transferring driving authority from the system to the occupant in the driver's seat, and is executed mainly under the plan of the action planning unit F6 in cooperation with the autonomous driving ECU 20 and the HMI system 15. In an authority transfer mode predetermined period, the occupant in the driver's seat is requested to take over the driving operation, and when the occupant executes a predetermined operation, such as gripping the steering wheel, during the processing, the transfer is completed. The state in which the authority transfer processing is executed is referred to as a transfer mode. The transfer mode can also include an operation mode in a process of transferring the driving authority from the occupant in the driver's seat to the system.

The mode control unit F5 may gradually reduce the autonomous driving level in the order of 5→4→3→2→1→0 due to the decrease in the number of the surrounding monitoring sensors 11 that are operated normally, or the deterioration of the environment. For example, when a recognizable distance of the front camera 11a caused by fog or rain is equal to or less than a predetermined value, the mode control unit F5 may switch the operation mode from the level 4 mode to the level 3 mode. Deterioration of the environment refers to, for example, an increase in rainfall or backlight. The concept of rainfall also includes snowfall.

The autonomous driving ECU 20 executes minimum risk maneuver (MRM) processing of safely stopping the vehicle when the occupant in the driver's seat is in the dead-man state during the autonomous driving mode or when the occupant in the driver's seat does not respond to the authority transfer processing. A content of the MRM processing can be, for example, processing of causing the vehicle to autonomously travel to a safe place and parking the vehicle while issuing a warning to the surroundings. The safe place includes a road shoulder with a width equal to or greater than a predetermined value, or a place defined as an emergency evacuation area. The content of the MRM may be stopping the vehicle in the lane on which the vehicle travels, with a gentle deceleration. As the deceleration in this case, it is preferable to adopt a value equal to or less than 4 [m/s^2], such as 2 [m/s^2] or 3 [m/s^2]. Of course, when it is necessary to avoid a collision with a preceding vehicle, the deceleration exceeding 4 [m/s^2] can be adopted. The deceleration during the MRM may be dynamically decided and sequentially updated in consideration of the traveling speed at the start of MRM and a vehicle-to-vehicle distance to a following vehicle within a range in which stopping is possible within, for example, 10 seconds.

When an override by the occupant in the driver's seat is detected, for example, based on the acquisition information of the operation content acquisition unit F4, the mode control unit F5 transitions to any operation mode of levels 0 to 2 based on the user setting. The mode control unit F5 outputs status information indicating the operation mode of the autonomous driving ECU 20 to the communication network. The status information corresponds to data indicating whether the travel mode of the subject vehicle is the autonomous driving mode or a manual driving mode from another viewpoint.

When the autonomous driving ECU 20 is in the autonomous driving mode, the action planning unit F6 creates the travel plan (in other words, the action plan) of the subject vehicle based on the surrounding environment recognized by the surrounding environment recognition unit F1. The travel plan includes a long-term plan and a short-term plan. The long-term plan includes the selection of a travel route to the destination on a road-by-road or lane-by-lane basis. The short-term plan includes, based on the long-term plan, the decision of a content of the action to be executed within a predetermined time (for example, 10 seconds) from the present time, and a specific control target value (for example, target vehicle speed, target acceleration, or target steering amount) for realizing the planned action. The short-term plan includes the selection of a next action to be executed at the present time (hereinafter, referred to as the scheduled action). Options for the scheduled action include maintaining the vehicle speed, acceleration, deceleration, stopping, starting, traveling on a straight road, turning a curve, the lane change, going straight at an intersection, a left turn, and a right turn. As the scheduled action, a complex action combining multiple actions, such as overtaking or parking, may be set. When the autonomous driving ECU 20 is in the driver-assistance mode, the action planning unit F6 calculates the control target value corresponding to an operation item (for example, speed adjustment) to be supported by the system.

The action planning unit F6 includes an adaptive cruise control (ACC) function, a lane trace control (LTC) function, an automatic emergency braking (AEB) function, and the like as element functions (applications) for providing the autonomous driving function. The ACC function is a function of causing the subject vehicle to travel regularly at a target vehicle speed or causing the subject vehicle to travel while following the preceding vehicle while maintaining the vehicle-to-vehicle distance with the preceding vehicle. The LTC function is a function of causing the subject vehicle to travel in a subject vehicle traveling lane along the subject vehicle traveling lane, and generating a scheduled traveling line along the subject vehicle traveling lane. The AEB function (so-called collision damage reduction brake) automatically executes braking when the collision with the object present in the front side of the vehicle is foreseen.

The control execution unit F7 decides the specific control amount of the various traveling actuators 18 based on the travel plan created by the action planning unit F6. Then, a control signal corresponding to the control amount is output to each traveling actuator 18. The control execution unit F7 also controls turning-on/turning-off of the direction indicator, the headlight, the hazard flasher, or the like in accordance with the travel plan or the external environment. When the travel mode of the subject vehicle is the operation mode of level 2 or lower, the control execution unit F7 integrally operates the traveling actuator 18 based on the manipulation information corresponding to the driving operation to be executed by the occupant in the driver's seat, and controls the behavior of the subject vehicle.

The abnormality detection unit F8 has a configuration of detecting an abnormality, the configuration being necessary for autonomous driving, such as the surrounding monitoring sensor 11, the locator 14, or the operation recording unit 30. For example, the abnormality detection unit F8 detects the abnormality in the front camera 11a based on the input of the error signal from the front camera 11a. The abnormality detection unit F8 diagnoses the operation state of the operation recording unit 30 by communicating with the operation recording unit 30. As a method of detecting the abnormality, various methods, such as a watchdog timer method or a homework answering method, can be used. The watchdog timer method is a method of determining that the monitored device is not operated normally when the watchdog timer provided in a monitoring device expires without being cleared by a watchdog pulse input from a monitored device. Here, the autonomous driving ECU 20 (specifically, the abnormality detection unit F8) corresponds to the monitoring device, and the operation recording unit 30 corresponds to the monitored device.

The homework answering method is a method of transmitting a predetermined monitoring signal from the monitoring device to the monitored device, and determining whether the monitoring device is operated normally depending on whether an answer returned from the monitored device is correct. In the homework answering method, the monitored device generates a response signal corresponding to the monitoring signal input from the monitoring device and returns the generated response signal to the monitoring device. The monitoring device determines that the monitored device is operated abnormally when the content of the response signal received from the monitored device is different from the data corresponding to the transmitted monitoring signal, or when the response signal is not returned within a predetermined limited time. When the abnormal operation of the operation recording unit 30 is detected, the autonomous driving ECU 20 may reset the operation recording unit 30. When it is detected that the operation recording unit 30 is not operated normally, the driving mode may be lowered to the level 2 or lower (that is, the driver-assistance mode). With the configuration that limits the operation mode to the level 2 or lower based on the fact that the operation recording unit 30 is not operated normally, it is possible to reduce a risk of executing autonomous traveling in a status in which there is the probability that various data are not recorded.

The abnormality detection unit F8 may be configured to detect an internal abnormality of the autonomous driving ECU 20. For example, when the autonomous driving ECU 20 includes multiple processing units 21, the multiple processing units 21 may be configured to diagnose each other's operating statuses by executing bidirectional communication.

The operation state output unit F9 sequentially outputs, to the operation recording unit 30, the recognition result of the surrounding environment by the surrounding environment recognition unit F1, the recognition result of the occupant in the driver's seat by the occupant state recognition unit F2, action plan data, the control data of the traveling actuator 18, and the like. The action plan data includes the action content selected by the action planning unit F6 and scheduled to be executed next, or the control target values, such as the target vehicle speed, the target acceleration, and a target traveling position. The control data of the traveling actuator 18 represents a content of the control signal output to each traveling actuator 18. The control data indicates, for example, output voltage/current values to the various traveling actuators 18 corresponding to the control amounts of the various traveling actuators 18.

<About Operation Recording Unit 30>

Figure 8:
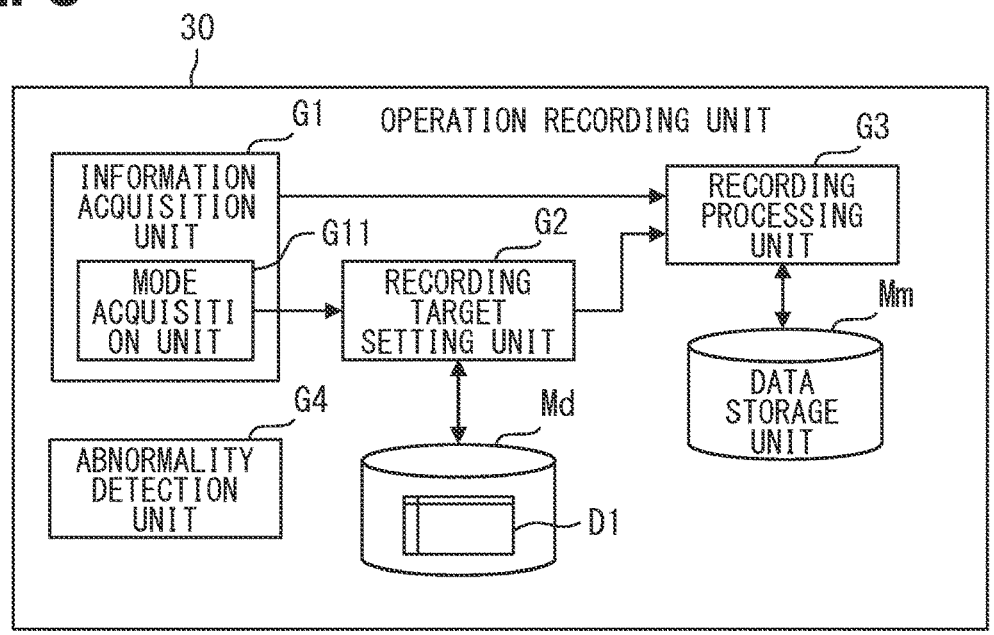
FIG. 8 is a block diagram showing a configuration of an operation recording unit.

Here, the function and the operation of the operation recording unit 30 will be described with reference to FIG. 8. The operation recording unit 30 provides functions corresponding to various functional blocks shown in FIG. 8 by executing a program stored in the storage 33. That is, the operation recording unit 30 includes an information acquisition unit G1, a recording target setting unit G2, the recording processing unit G3, and an abnormality detection unit G4 as functional blocks. The information acquisition unit G1 includes a mode acquisition unit G11. The operation recording unit 30 includes a recording target setting storage unit Md and a data storage unit Mm.

The recording target setting storage unit Md is a storage medium that stores data indicating the recording target for each driving mode (hereinafter, recording target setting data D1). The data storage unit Mm is a data storage destination by the recording processing unit G3. Each of the recording target setting storage unit Md and the data storage unit Mm is implemented by using a part of a storage area included in the storage 33. The recording target setting storage unit Md and the data storage unit Mm may be implemented by using physically independent storage media. A part or all of the data storage unit Mm may be provided outside the vehicle, such as the server.

Figure 9:
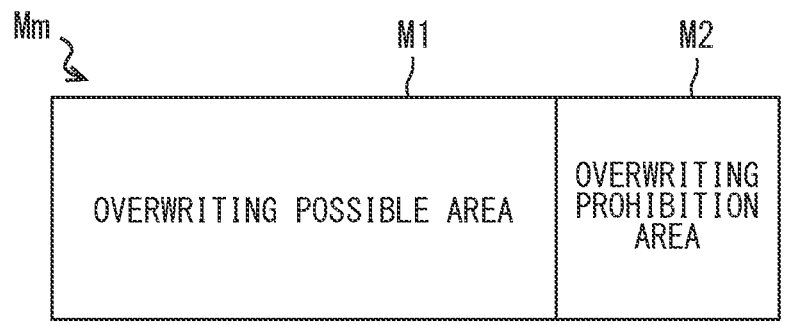
FIG. 9 is a conceptual diagram for describing a configuration of a data storage unit.

As shown in FIG. 9, the data storage unit Mm has an overwriting possible area M1 and an overwriting prohibition area M2. The overwriting possible area M1 is an area in which the stored data can be overwritten with another data, in other words, the stored data can be deleted. The overwriting prohibition area M2 is an area in which the execution of overwriting of the stored data is impossible/prohibited. The overwriting possible area M1 and the overwriting prohibition area M2 may be logically partitioned by using a partition technology, or may be physically independent. The overwriting prohibition area M2 may be implemented by using a non-rewritable storage medium, or may be configured to prohibit data deletion by software. Here, as an example, the overwriting prohibition area M2 is a storage area set such that automatic data overwriting cannot be executed by software.

The overwriting prohibition area M2 is not an essential element. In the data storage unit Mm, the overwriting possible area M1 and the overwriting prohibition area M2 do not need to be clearly separated. The overwriting possible area M1 and the overwriting prohibition area M2 may be separated by the concept of a folder. The overwriting prohibition area M2 may be configured to delete the stored data by the operation by the user or a professional vendor, or by an instruction signal from a predetermined server.

As an example, it is preferable that each of the overwriting possible area M1 and the overwriting prohibition area M2 have a capacity capable of recording a data set recorded by, for example, event recording processing described later for 2500 times. Here, as an example, it is assumed that the overwriting prohibition area M2 has a capacity capable of recording 2500 sets of the image signal of the front camera 11*a* for 35 seconds. The number of recordable times need only be equal to or greater than 2000. With the capacity, it is possible to store the data for about 6 months.

The information acquisition unit G1 sequentially acquires multiple types of information that can be recording targets from various in-vehicle devices, such as the autonomous driving ECU 20 or the surrounding monitoring sensor 11, assigns information (so-called time stamp) indicating the acquired time, and provides the information to the recording processing unit G3.

As a major classification of the information that can be recording targets for example, as shown in FIG. 10, the driving mode, time information, the state of the occupant in the driver's seat, the operation content of the occupant, a body signal, a mode notification state, a traveling place, the observation data of the surrounding monitoring sensor 11, and the operation state information of the autonomous driving ECU 20 are included. The occupant state data includes items, such as whether the occupant in the driver's seat is aroused, eyes on/off, hands on/off, and captured image data of the face of the occupant in the driver's seat. The occupant state data can include the pressure distribution detected by the seat sensor 12*b*, the output value of the steering wheel sensor 12*c* (for example, the steering wheel torque), or the like.

The mode notification state refers to a notification status to the occupant regarding the operation state of the autonomous driving ECU 20. For example, it refers to a display content as the driving mode notification image 80. The information acquisition unit G1 acquires the screenshot of the display 153 displaying the driving mode notification image 80 as the mode notification state by the HMI system

15. An output signal from the autonomous driving ECU 20 to the HMI system 15 or an output signal from the HCU 151 to various notification devices (for example, the display 153) may be included in the mode notification state.

The traveling place includes items, such as the position coordinate and the road type. The operation state of the autonomous driving ECU 20 includes items, such as recognition result information of other vehicles or lane markings by the surrounding environment recognition unit F1, planned action information by the action planning unit F6, and control values decided by the control execution unit F7. The mode acquisition unit G11 acquires operation mode information from the autonomous driving ECU 20 and provides the acquired operation mode information to the recording target setting unit G2.

An acquisition interval of various data by the information acquisition unit G1, such as the driving mode, the arousal state, the eyes on/off, the hands on/off, the operation content, the body signal, the mode notification state, the traveling place, and the operation state of the autonomous driving ECU 20 can be, for example, 100 milliseconds. A specific value of the acquisition interval of the data can be changed as appropriate. The acquisition interval of the data by the information acquisition unit G1 corresponds to a storage interval of the data by the recording processing unit G3, which will be described later. The acquisition interval of the data may be dynamically changed in accordance with the status. The image data captured by the surrounding monitoring camera or the DSM 12*a* may be acquired as a continuous image signal.

The vehicle state may be included as the major classification of the information that can be recording targets The vehicle state includes items, such as the vehicle speed, the acceleration, the yaw rate, the shift position, the engine rotation speed, the turning angle, and the operation state of the body-based in-vehicle device. These information can be acquired from the vehicle state sensor 13 and the body ECU 17.

The recording target setting unit G2 sets information items to be the recording targets, in accordance with the current operation mode of the autonomous driving ECU 20. Here, as an example, the recording target for each operation mode is changed in the aspect shown in FIG. 10. Specifically, during the level 0 to 2 modes, the driving mode, the time, the operation content of the occupant in the driver's seat, and the notification state of the HMI are set as the recording targets.

During the authority transfer mode, the driving mode, the time, an arousal level of the occupant, eyes on/off, hands on/off, the face image, the operation content of the occupant, the notification state of the HMI, the traveling position coordinate, the road type, the recognition results of the lane line and the like, and an actuator control value are set as the recording targets. During the level 3 mode, the driving mode, time, the arousal state of the occupant, the face image, the body signal, the mode notification state, the traveling position coordinate, the road type, the front camera image, the recognition results of the lane line and the like, the scheduled action, and the actuator control value are set as the recording targets. During the level 4 mode, the driving mode, the time, the body signal, the mode notification state, the traveling position coordinate, the road type, the observation data of the multiple surrounding monitoring sensors 11 including the front camera 11*a*, the recognition results of the lane line and the like, the scheduled action, and the actuator control value are set as the recording targets. During the level 5 mode, the driving mode, the time, the body signal, the mode notification state, the traveling position coordinate, the observation data of the multiple surrounding monitoring sensors 11 including the front camera 11*a*, the recognition results of the lane line and the like, the scheduled action, and the actuator control value are set as the recording targets.

The recording processing unit G3 is configured to store the data of the items set as the recording target by the recording target setting unit G2 in the data storage unit Mm. In the present embodiment, as an example, the recording processing unit G3 is configured to be operated in two methods, an always-recording method and an event recording method. That is, the recording processing unit G3 sequentially stores the recording target data acquired by the information acquisition unit G1 in the overwriting possible area M1 as the always-recording method. The sequentially acquired data is, for example, stored in chronological order such that the latest data comes first. When the capacity of the overwriting possible area is full, the recording processing unit G3 can delete old data and store new data.

As the event recording method, the recording processing unit G3 executes the event recording processing when a predetermined recording event has occurred. The event recording processing is processing of storing the recording target data within a predetermined time before and after the event occurrence time in the data storage unit Mm in an overwriting prohibition format. For example, the recording processing unit G3 stores the recording target data within the predetermined time before and after the event occurrence time in the overwriting prohibition area M2 as the event recording processing. A data recording destination associated with the occurrence of the recording event does not necessarily have to be the overwriting prohibition area M2. The data recording destination may be the overwriting possible area M1. The storage format of the data associated with the occurrence of the recording event may also be a format that allows overwriting with new data.

As the recording event, for example, a case in which the autonomous driving level is lowered due to the user operation, the system limit, or the exit from the ODD, a case in which the AEB is operated, a case in which the MRM is started, or the like can be adopted. The case in which the autonomous driving level is lowered includes a case in which the autonomous driving mode, such as the level 3 mode, transitions to the occupant involvement mode, such as the level 2 mode. A case in which a collision sensor senses an impact equal to or greater than a predetermined threshold, a case in which the output value of the acceleration sensor is equal to or greater than a predetermined threshold, a case in which the output value of the yaw rate sensor is equal to or greater than a predetermined threshold, or the like can be adopted as the recording event. The recording event may include the start of execution of an application, such as the ACC or the LTC. Switching the driving mode may be included in the recording event.

As the recording event, a case in which the TTC or the MTC calculated by the autonomous driving ECU 20 is equal to or less than a predetermined recording threshold may be adopted. It is preferable that the recording threshold be set to, for example, a value indicating a state in which the probability of collision is high. For example, it is possible to adopt a value at which the collision damage reduction brake is operated. More specifically, the recording threshold for the TTC can be 1.4 seconds to 1.6 seconds. The recording threshold for the TTC can be 1.4 seconds to 1.6 seconds. The recording threshold for the MTC can be a value equal to or less than 1.0 (for example, 0.8 seconds). By adopting the decrease in the TTC or the MTC as the recording event, it is possible to execute recording before the collision actually occurs, and it is possible to reduce the risk of recording failure due to the impact of the collision.

As shown in FIG. 11, a recording target period is, for example, a period from before a pre-time Tα at the event occurrence time to the elapse of a post-time Tβ. For example, the pre-time Tα is set to 30 seconds, and the post-time Tβ is set to 5 seconds. With such a configuration, it is possible to store the data for 35 seconds before and after the event occurrence time. The pre-time Tα may be, of course, 15 seconds, 30 seconds, 45 seconds, 60 seconds, or the like. The post-time Tβ can also be 3 seconds, 10 seconds, or 15. As the pre-time Tα or the post-time Tβ is longer, the improvement of the analyzability of the cause of the occurrence of the event, such as an accident, can be expected, but a risk of the shortage storage capacity is increased. As the pre-time Tα or the post-time Tβ is shorter, the risk of the shortage of the storage capacity can be reduced, but there is a risk of the lack of the information necessary for investigating the cause of the accident or the like. According to the settings of 30 seconds before the event and 5 seconds after the event, it can be expected that it is possible to sufficiently secure the analyzability of the cause of the occurrence of the event while reducing the shortage of the storage capacity. According to such an aspect, when the recording event has occurred in the autonomous driving mode, the observation data of the surrounding monitoring sensor 11 for 35 seconds before and after the event is stored in a mode in which overwriting is prohibited, so that it is possible to analyze the cause of the accident based on objective facts. Regarding the data before the event occurrence time, for example, various data stored in the overwriting possible area M1 need only be copied to the overwriting prohibition area M2. The data after the event has occurred need only be additionally stored in the overwriting prohibition area M2 in sequence. The data stored in the data storage unit Mm may be encrypted and stored such that the contents cannot be referred to unless predetermined software used by a data analyst is used.

A length of the recording target period may be changed in accordance with a type and a characteristic of the recording event. The recording target period at the time of the AEB operation may be set longer than the recording target period at the start of the ACC in order to surely grasp the circumstances before and after the accident. The recording target period of the start of the ACC need only surely include before and after the transition, and can be, for example, a pre-time of 5 seconds and a post-time of 3 seconds. The recording target period at the time of transition from the level 5 mode to the level 4 mode may be set shorter than the recording target period at the time of transition from the level 3 mode to the level 2 mode. From the level 4 mode to the level 5 mode, it is completed in the system (in other words, the occupant is not involved), so even when the recording target period is set relatively short, the problem is less likely to occur. On the other hand, by setting the recording target period at the time of transition from the level 3 mode to the level 2 mode to be relatively long, the circumstances before and after the transfer of authority can be surely grasped.

That is, multiple patterns may be prepared for the length of the recording target period, and the length may be selected in accordance with a degree of seriousness of the recording event or a degree of involvement of the occupant. It is preferable to set the recording target period to be longer as the degree of seriousness or the degree of involvement of the occupant is higher. The recording event with a high degree of seriousness includes, for example, the occurrence of a collision, the operation of the AEB, or the execution of the MRM. The recording event with a high degree of involvement of the occupant is, for example, the transition from the level 3 mode to the level 2 mode. In addition to the level 3 mode, in the transition from the autonomous driving mode to the occupant involvement mode by the override of the occupant, the degree of involvement of the occupant is relatively high. In the transition from the level 3 mode to the occupant involvement mode due to the system limit, the degree of seriousness is relatively higher than in the transition from the level 3 mode to the occupant involvement mode, which is planned and notified to the occupant in advance. The length of the recording target period for each event can be set in consideration of the degree of seriousness or the degree of involvement of the occupant as described above. With the configuration in which the recording target period is changed in accordance with the characteristic of the event, it is possible to store the data as much as necessary for post-analysis. For example, the recording target period of the event with relatively low degree of seriousness or degree of involvement of the occupant can be set short, and a risk of storing unnecessary data can be reduced.

In the present embodiment, the recording processing unit G3 is configured to be operated in two methods, the always-recording method and the event recording method, but the present disclosure is not limited to this. The recording processing unit G3 may be configured to execute data recording only when the predetermined recording event has occurred. With the configuration in which only the event recording processing is executed, for example, the storage amount of the data per month can be reduced as compared with a configuration in which the always-recording method is adopted. The recording processing unit G3 may be configured to be operated only in the always-recording method.

The abnormality detection unit G4 is configured to determine whether the operation recording unit 30 itself and the autonomous driving ECU 20 are operated normally. As the method of detecting the abnormality, the method described above, such as the watchdog timer method or the homework answering method, can be used. For example, the abnormality detection unit G4 may determine that the autonomous driving ECU 20 is operated abnormally when the watchdog timer thereof expires without being cleared by the watchdog pulse input from the autonomous driving ECU 20.

When the internal abnormality of the operation recording unit 30 is detected, the abnormality detection unit G4 notifies the autonomous driving ECU 20 of that fact. The occurrence of the internal abnormality need only be detected based on the fact that a calculation result deviates from a normal range, the occurrence of an abnormal voltage, the output of an abnormality code, and the like. Whether the operation recording unit 30 is operated normally may be diagnosed by an on-board diagnostics (OBD). The abnormality detection unit G4 may be implemented by using the OBD. With the configuration in which the processing unit 21 that provides the autonomous driving function and the processing unit 31 that is in charge of the data recording processing are independent as in the present embodiment, the operation state can be mutually monitored. Therefore, when the problem has occurred in any of the units, that fact can be quickly detected. As a result, when the problem has occurred in any of the processing unit 21 and the processing unit 31, the autonomous driving mode can be quickly interrupted or the like.

<Detailed Description of Operation of Operation Recording Unit 30>

Figure 12:
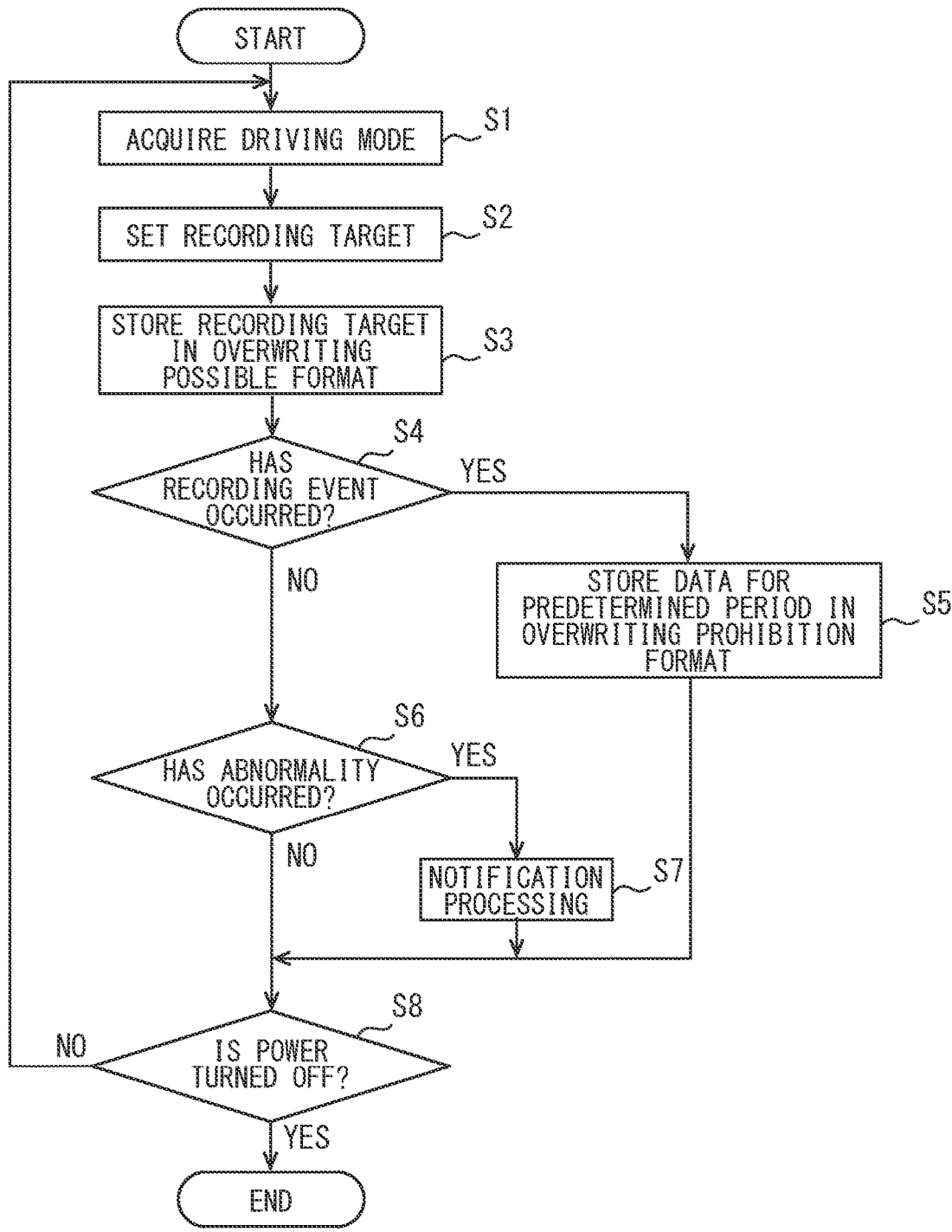
FIG. 12 is a flowchart showing an operation of the operation recording unit.

Next, an operation flow of the operation recording unit 30 will be described with reference to the flowchart shown in FIG. 12. The flowchart shown in FIG. 12 need only be started, for example, at the time when a traveling power supply of the vehicle is turned on. The traveling power supply is, for example, an ignition power supply in an engine vehicle. In an electric vehicle, a system main relay corresponds to the traveling power supply. Although not shown in FIG. 12, the information acquisition unit G1 sequentially acquires various data or the image signals. The acquisition of various information by the information acquisition unit G1 can also be included in step S1.

First, in step S1, the mode acquisition unit G11 acquires the driving mode information from the autonomous driving ECU 20 and proceeds to step S2. Step S1 corresponds to a mode acquisition step. In step S2, the recording target setting unit G2 decides the data type, which is the recording target, based on the driving mode information acquired in step S1 and the recording target setting data D1 stored in the recording target setting storage unit Md. Step S2 corresponds to a recording target setting step. When there is no change in the driving mode since previous step S2 is executed, step S2 can be omitted.

In step S3, the recording processing unit G3 stores multiple types of data set as the recording targets in the data storage unit Mm together with the time stamp indicating the acquisition time in the overwriting possible format. For example, the recording target data is stored in the overwriting possible area M1 together with the time stamp. Step S3 corresponds to a recording step. When step S3 is completed, step S4 is executed.

In step S4, the recording processing unit G3 determines whether the recording event has occurred based on various information (for example, acceleration) acquired by the information acquisition unit G1. When it is determined that the recording event has occurred, step S5 is executed. On the other hand, when it is not determined that the recording event has occurred, step S6 is executed. In step S5, the recording processing unit G3 stores the recording target data for a predetermined time before and after the present in the data storage unit Mm in the overwriting prohibition format. For example, the above data set is stored in the overwriting prohibition area M2. When the processing of step S5 is completed, the processing proceeds to step S8. Step S5 also corresponds to an example of the recording step.

In step S6, the abnormality detection unit G4 determines whether the abnormality has occurred in the operation recording unit 30. When the abnormality has occurred in the operation recording unit 30, step S7 is executed. On the other hand, when no abnormality has occurred in the operation recording unit 30, step S8 is executed. In step S7, the abnormality detection unit G4 outputs a signal indicating that the operation recording unit 30 is not operated normally to the LAN 99. When the signal indicating that the operation recording unit 30 is not operated normally is received via, for example, the LAN 99, during the autonomous driving mode, the autonomous driving ECU 20 executes the authority transfer processing to transition to the operation mode of the level 2 or lower. When the signal indicating that the operation recording unit 30 is not operated normally is received, the HMI system 15 displays and outputs that fact to the display 153 or the like. When the operation recording unit 30 is not operated normally, the HMI system 15 may notify the occupant that the autonomous driving mode cannot be used due to the event.

In step S6, it is determined whether the traveling power supply is turned off. When the traveling power supply is turned off, the present flow ends. On the other hand, when the traveling power supply is not turned off, that is, when the traveling power supply remains turned on, the processing returns to step S1 and the processing after step S1 is repeated. With such a configuration, while the traveling power supply is turned on, various information in accordance with the operation mode can be recorded by both the always-recording method and the event recording method.

<Effect of Above Configuration>

In the above configuration, the items to be the recording targets are changed in accordance with the driving mode. For example, in accordance with the driving mode, whether to use, as the recording target, the data indicating the state of the occupant in the driver's seat, such as the face image of the occupant, is changed. With this configuration, the state of the occupant in the driver's seat is not always recorded. For example, in the level 4 to 5 modes in which the occupant in the driver's seat is not responsible for driving, it is possible to exclude the data indicating the state of the occupant in the driver's seat from the recording target. Therefore, it is possible to reduce amount of the data to be stored. With the above configuration, during the level 3 mode, the face image of the occupant in the driver's seat captured by the DSM 12a is set as the recording target as the data indicating the state of the occupant in the driver's seat. As a result, it is possible to verify whether the occupant in the driver's seat is in a state of capable of driving in an emergency. The level 3 mode corresponds to an example of a driving mode in which the occupant in the driver's seat is responsible for driving.

In a case of the accident of the vehicle having an autonomous travel function, it should be possible to objectively analyze, at a later time, whether the system or the driver is responsible for driving at the time of the accident, and when the system is responsible for driving, what determination is the system controlled by. In the above configuration, during the autonomous driving mode, an object recognition state of the autonomous driving ECU 20 and the content of the scheduled action are also recorded. Therefore, it is possible to analyze how the autonomous driving ECU 20 recognizes the outside and what the autonomous driving ECU 20 tries to do. Therefore, it is possible to improve the analyzability of the cause of the occurrence of the accident or the responsibility during autonomous driving.

In the level 3 mode, the image signal of the front camera 11a is included in the recording target. In the level 4 mode, in addition to the image of the front camera 11a, the observation data of other surrounding monitoring sensors 11, such as the millimeter wave radar, are also recorded. With such a configuration, an actual status of the outside can be specified. Since the recognition result or determination content (for example, scheduled action) of the autonomous driving ECU 20 is also recorded as a set with the observation data of the surrounding monitoring sensor 11, it is possible to compare and verify the actual status of the outside and the behavior of the autonomous driving ECU 20.

Further, in the level 3 to 5 modes, the control amounts of the various traveling actuators 18 by the autonomous driving ECU 20 are also set as the recording targets together with the recognition state or the determination result of the surrounding environment. By sequentially recording the recognition/determination/control results of the autonomous driving ECU 20 as a set, it is easier to analyze the cause when the recording event, such as the accident, has occurred during the autonomous driving mode.

Then, in the above configuration, the observation data of the surrounding monitoring sensor 11 is not always stored. The driving mode in which the observation data of the surrounding monitoring sensor 11 is included in the recording target and the driving mode in which the observation data of the surrounding monitoring sensor 11 is not included are mixed. Specifically, the image of the front camera 11a is the recording target in the level 3 to 5 modes and the authority transfer mode, but is not included in the recording target in the operation mode of the autonomous driving level 2 or lower. The image of the rear camera 11b, the image of the right lateral camera 11c, the image of the left lateral camera 11d, and the sensing data of the millimeter wave radar are included in the recording target in the level 4 to 5 modes, but are not recorded during the mode of level 3 or lower. With such a configuration, the storage amount of the data as an operation recording device of the autonomous driving device can be further reduced.

In the authority transfer mode, the recognition result of the system, such as eyes on/off, and the observation data, such as the face image, are recorded as a set as the state of the occupant in the driver's seat. With such a configuration, the recognition result of the system and the actual state of the occupant in the driver's seat can be compared and verified. Therefore, even when the accident has occurred during the transfer of authority, it is easier to verify the responsibility. Even when the recognition result of the state of the occupant by the system and the assertion of the occupant in the driver's seat do not match, the fact can be confirmed based on the face image data.

The recording target setting unit G2 includes the mode notification state in the recording target in each operation mode. In particular, as the mode notification state, the screenshot of the display 153 set as the display destination of the driving mode notification image 80 is included in the recording target. With such a configuration, it is possible to verify the credibility of the testimony of the occupant in the driver's seat when the testimony of the occupant in the driver's seat and the system record are different from each other in the driving mode at the time of the accident.

While the embodiment of the present disclosure has been described above, the present disclosure is not limited to the embodiment described above, and various modifications to be described below are included in the technical scope of the present disclosure, and can be executed by various changes within a scope not departing from the spirit described below. For example, various modifications to be described below can be executed in combination as appropriate within a scope that does not cause technical inconsistency. The members having the same functions as those described in the embodiment described above are denoted by the same reference numerals, and the description of the same members will be omitted. When referring to only a part of the configuration, the configuration of the embodiment described above can be applied to other portions.

<Supplement to Function and Configuration of Autonomous Driving ECU 20>

In the above aspect, the autonomous driving ECU 20 is configured to be able to execute up to the level 5, but the present disclosure is not limited to this. The autonomous driving ECU 20 may execute autonomous driving up to the level 3. In that case, the operation recording unit 30 need only include a data set, which is the recording target, up to the level 3. The autonomous driving ECU 20 may include only modes corresponding to the autonomous driving levels 0, 2, and 4. The operation mode of the autonomous driving ECU 20 may be three stages of a complete manual driving mode, the driver-assistance mode, and the autonomous driving mode. The recording target setting storage unit Md need only store the recording target setting data for each driving mode that can be provided by the autonomous driving ECU 20.

Figure 13:
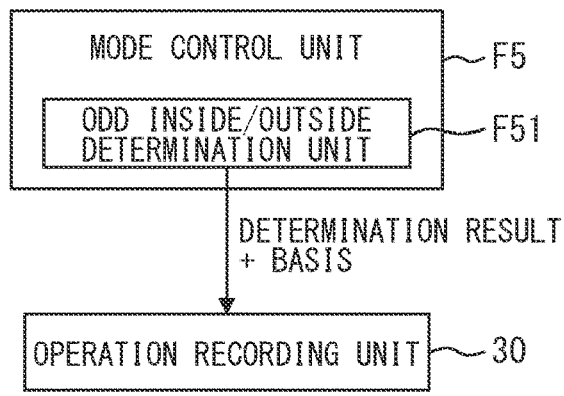
FIG. 13 is a diagram for describing an interoperation between an ODD inside/outside determination unit and the operation recording unit.

As shown in FIG. 13, the autonomous driving ECU 20 (for example, the mode control unit F5) may include an ODD inside/outside determination unit F51 that sequentially determines whether the surrounding environment of the subject vehicle satisfies the ODD. The ODD includes (a) the traveling road is the expressway or the motorway with two or more lanes each way equipped with a median strip and the guard rail, and (b) there are no traffic light or pedestrian in the detection range of the surrounding monitoring sensor. The ODD includes (c) rainfall is equal to or less than a predetermined threshold, (d) there are no falling object or vehicle parked on the road within a predetermined distance of the subject vehicle, and (e) the surrounding monitoring sensor 11 including the on-board camera is operated normally. A condition for determining whether autonomous driving is possible/impossible, in other words, a detailed condition for defining the ODD can be changed as appropriate. In addition to the ODD for the autonomous driving level 3, the ODD for the autonomous driving level 4 may be set. For example, for the ODD for the autonomous driving level 4, a stricter condition than for the ODD for autonomous driving level 3 may be set from the viewpoint of the number of surrounding monitoring sensors that are operated normally (in other words, redundancy) or an allowable position estimation error.

As shown in FIG. 13, when the autonomous driving ECU 20 includes the ODD inside/outside determination unit F51, the recording target setting unit G2 may set the determination result by the ODD inside/outside determination unit F51 and the sensor data which is a determination basis as the recording targets, during the level 3 to 4 mode. A material for determining whether the ODD is satisfied is determined in accordance with the content of the ODD. As the material for determining whether the ODD is satisfied, for example, the road type, the road structure (for example, the number of lanes), the weather information, the sensing information of the surrounding monitoring sensor 11, the presence or absence of the falling object, or the like can be adopted.

Further, when the ODD inside/outside determination unit F51 can calculate a remaining time to exit from the ODD (hereinafter, the ODD exit remaining time), the recording target setting unit G2 may include the calculated value of the ODD exit remaining time in the recording target. For example, when the road segment capable of autonomous traveling is defined as the ODD, the remaining time for the subject vehicle to exit from the road segment corresponds to the ODD exit remaining time. More specifically, when the ODD is limited to the expressway, the time to exit from the expressway corresponds to the ODD exit remaining time.

The recording target setting unit G2 may always include both the recognition result of eyes on/off and the face image data in the recording targets during the level 3 mode, but may set both the recognition result of eyes on/off and the face image data as the recording target based on the time when the ODD exit remaining time is equal to or less than a predetermined threshold in the level 4 mode. In other words, the face image data is not stored when there is time to exit from the ODD. With such a configuration, the storage amount of the data can be reduced.

The recording processing unit G3 may adopt the determination by the autonomous driving ECU 20 (specifically, the ODD inside/outside determination unit F51) that the subject vehicle has exited from the ODD or that the subject vehicle will exit from the ODD within a predetermined time, as the recording event. Specifically, during the level 3/4 mode, when the ODD inside/outside determination unit F51) determines that the subject vehicle has exited from the ODD or that the subject vehicle will exit from the ODD within the predetermined time, the recording processing unit G3 may record the determination basis data, which is the material used for the determination, in the data storage unit Mm. The determination basis data need only be acquired by the autonomous driving ECU 20. It is preferable that the storage destination of the determination basis data be the overwriting prohibition area M2. It is preferable that the determination basis data be stored as a set with the determination result, the determination time, and the position information.

Figure 14:
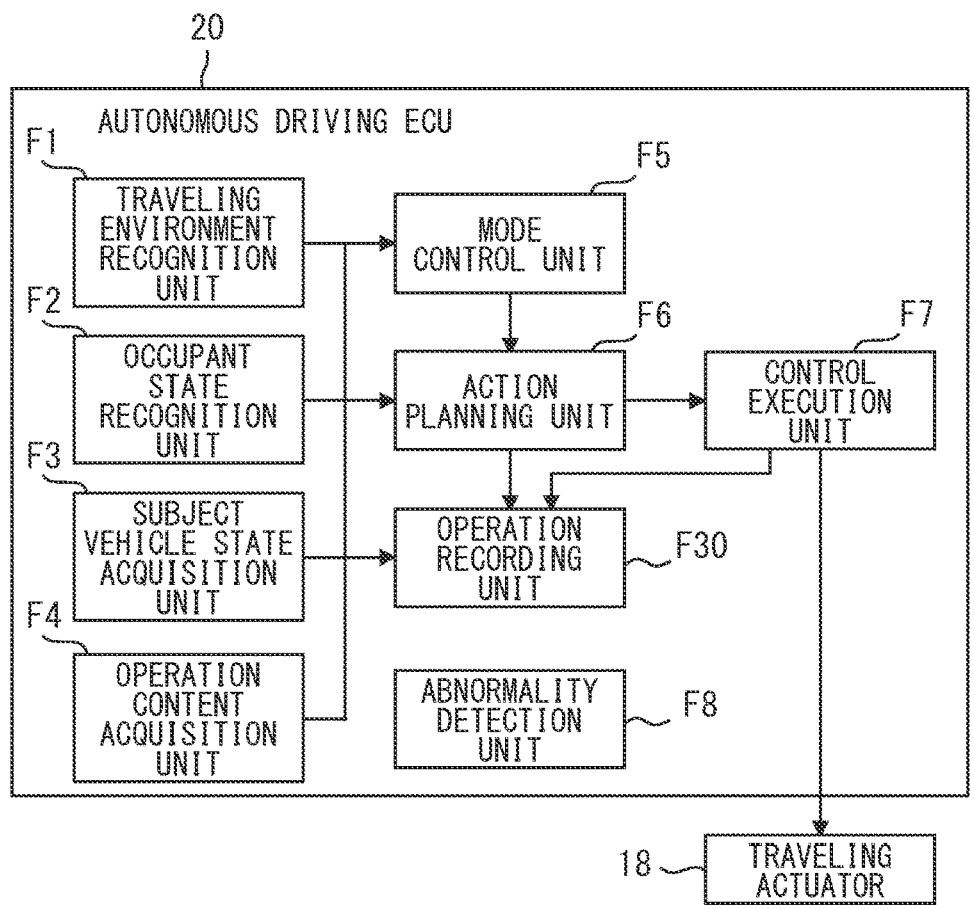
FIG. 14 is a block diagram showing a modification of the autonomous driving ECU.

The operation recording unit 30 may be built in the autonomous driving ECU 20. In other words, as shown in FIG. 14, the autonomous driving ECU 20 may include an operation recording unit F30 corresponding to the operation recording unit 30.

<Supplement to Surrounding Monitoring Sensor 11>

Figures 15, 16:
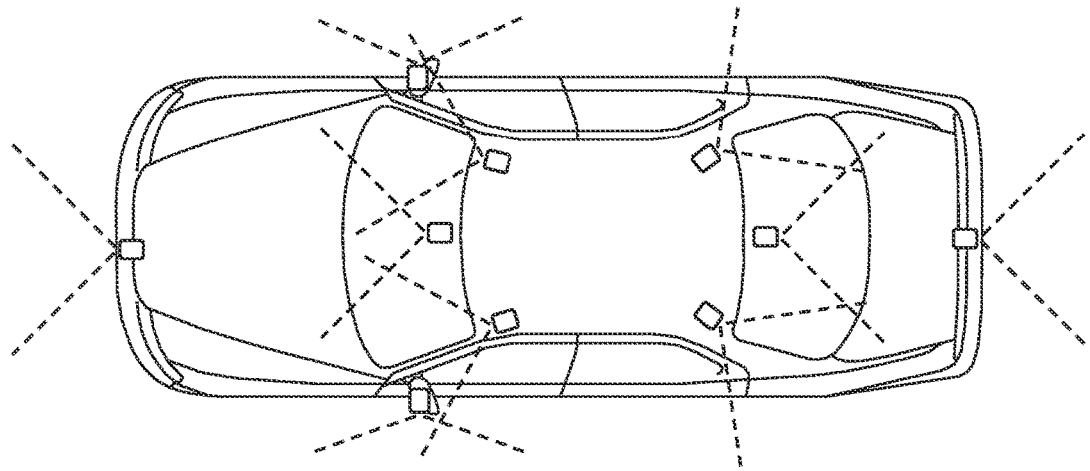
FIG. 15 is a diagram showing a modification of the number of mounted surrounding monitoring sensors.
FIG. 16 is a diagram showing an example of a correspondence relationship between a scheduled action during an autonomous driving mode and the surrounding monitoring sensor for which the observation data is the recording target.

The mounting positions of the surrounding monitoring cameras are not limited to four locations of front, back, left, and right. As shown in FIG. 15, the surrounding monitoring cameras may be provided at six locations of a front end, a rear end, the left and right side mirrors, an internal side upper end portion of the front windshield, and an internal surface of the rear windshield. Four surrounding monitoring cameras with optical axes directed to each of a right diagonal front side, a left diagonal front side, a right diagonal rear side, and a left diagonal rear side may also be mounted on a roof portion. A large number of millimeter wave radars may be provided in the same manner. The autonomous driving system 1 may include a LiDAR that includes the front side of the vehicle in the detection range and a LiDAR that includes the rear side of the vehicle in the detection range, as the surrounding monitoring sensors 11. The LiDAR can be mounted, for example, on the roof. The autonomous driving system 1 may include multiple sonars having different detection ranges and installation positions as the surrounding monitoring sensors 11. The sonar can be mounted on a bumper or a side sill.

<Supplement to Recording Method of Observation Data of Surrounding Monitoring Sensor 11>

The combination of the surrounding monitoring sensors 11 for which the observation data is the recording target in the autonomous driving mode may be changed in accordance with a driving scene, an action being executed, or the scheduled action. The observation data of the surrounding monitoring sensor 11 including, in the detection range, a direction that requires attention in the action that is executed/scheduled by the autonomous driving ECU 20 may be included in the recording target, whereas the observation data of the surrounding monitoring sensor 11 including, in the detection direction, a direction that requires less attention may be excluded from the recording target. Such a configuration is particularly suitable for a vehicle on which a large number (for example, eight or more) of surrounding monitoring cameras and the like are mounted, as shown in FIG. 15, for example. This is because the amount of the data is larger as the number of surrounding monitoring sensors 11 is larger.

Hereinafter, the front sensor refers to the surrounding monitoring sensor 11 that includes the front side in the detection range. The front sensor can include a sensor of which the detection range is the left and right diagonal front sides. The surrounding monitoring sensor 11 of which the main detection range is the rear side is also referred to as a rear sensor. The surrounding monitoring sensor 11 of which the main detection range is the rear can be a sensor of which the center axis of the detection range is directed in a direction within 45 degrees from the rear side of the vehicle. The rear sensor can include a sensor (for example, the right rear radar 11f) of which the detection range is the left and right diagonal rear sides. The surrounding monitoring sensor 11 of which the main detection range is the left/right sides is also referred to as a lateral sensor. The surrounding monitoring sensor 11 of which the main detection range is the lateral side can be a sensor of which the center axis of the detection range is directed in a direction within 45 degrees from the lateral direction.

FIG. 16 shows a combination of the surrounding monitoring sensors 11 for which the observation data for each scheduled action is the recording target. As shown in FIG. 16, for example, while the subject vehicle autonomously travels along the road, the observation data of the front sensor may be included in the recording target, whereas the observation data of the rear sensor may be excluded from the recording target. The observation data of the lateral sensor may be recorded at a lower resolution or sampling rate than that of the front sensor. The reason why the observation data of the lateral sensor is included in the recording target is that there is a demand for recording interruptions from adjacent lanes or tailgating action. Based on the same technical idea, the observation data of the rear sensor may be recorded at a lower resolution or sampling rate than the observation data of the front sensor even when the subject vehicle autonomously travels along the road.

When the autonomous driving ECU 20 plans to automatically change the lanes to the right side, the observation data of the surrounding monitoring sensor 11 including the range from the right diagonal front side to the right diagonal rear side in the detection range may be included in the recording target, whereas the observation data of other surrounding monitoring sensors 11 may be excluded from the recording target. When planning to change the lanes to the left side, the observation data of the surrounding monitoring sensor 11 including the range from the left diagonal front side to the left diagonal rear side in the detection range may be included in the recording target, whereas the observation data of other surrounding monitoring sensors 11 may be excluded from the recording target.

When the autonomous driving ECU 20 executes or plans deceleration toward a stop as the scheduled action, the observation data of the front sensor and the rear sensor may be the recording target, whereas the observation data of the lateral sensor may be excluded from the recording target. When executing or planning the right turn/left turn at the intersection as the scheduled action, the observation data of the front sensor and the lateral sensor may be recording target, whereas the observation data of the rear sensor may be excluded from the recording target. The observation data of the surrounding monitoring sensor 11, which is not related to the moving direction, may be excluded from the recording target during traveling, whereas the observation data of all the surrounding monitoring sensors 11 may be included in the recording target when executing or planning automatic parking or automatic departure as the scheduled action. When executing the MRM, the observation data of all surrounding monitoring sensors 11 may be included in the recording target regardless of the moving direction and the like.

With the above configuration, in the action to be executed or planned, the observation data of the surrounding monitoring sensor 11 including, the detection range, the direction that requires attention is included in the recording target, whereas the observation data of other surrounding monitoring sensors 11 are excluded from the recording target, or the amount of information thereof is reduced and stored. By excluding the observation data of some of the surrounding monitoring sensors 11 from the recording target in this way, the stored data can be reduced. The reason why the observation data of the front sensor is included in the recording target at the time of deceleration is that there is the probability of the reason of deceleration is present in front.

With the above configuration, since the observation data is included in the recording target in the direction that requires attention, it is possible to leave the data indicating the objective fact in the direction. Therefore, post-analyzability can be secured while reducing the storage amount of the data. The direction that requires attention corresponds to a direction in which a risk of collision is high or a direction in which the subject vehicle is about to move.

In the above configuration, the recording target setting unit G2 may include, in the recording target, the recognition result of the autonomous driving ECU 20 in the direction in which the observation data is not included in the recording target. For example, when traveling along the road, the observation data of the rear sensor is not recorded, but the recognition result of the object present on the rear side of the vehicle based on the data may be included in the recording target. The recognition result of the object can include, for example, a tagging state, a type, and a tracking state of the object in addition to the position information, the speed, or the moving direction. Even when the observation data of a certain surrounding monitoring sensor 11 is excluded from the recording target, the rough status can be grasped by including the recognition state of the autonomous driving ECU 20 based on the surrounding monitoring sensor 11 in the recording target.

Further, it is preferable that, during the autonomous driving mode, the recording target setting unit G2 set, as a set, the observation data of the surrounding monitoring sensor 11 in the direction related to the action being executed (hereinafter, current action) and the scheduled action, and the recognition result of the object in the direction (tagging state) as the recording target. The direction related to the current action and the scheduled action means, for example, from the diagonal front side to the diagonal rear side on the lane change side in a case of the lane change. The direction related to deceleration refers to the rear side. The direction related to parking can be, for example, all azimuths. The directions related to the right and left turns can be the front side or the lateral side. With this configuration, it is possible to verify how the autonomous driving ECU 20 recognizes based on the sensing information in the direction that requires attention.

The above configuration corresponds to a configuration in which the autonomous driving ECU 20 includes, in the recording target, data indicating the behavior of other vehicles present in the direction corresponding to the scheduled action of the subject vehicle during the autonomous driving mode. The data indicating the behavior of the surrounding vehicles refers to, for example, the observation data of the surrounding monitoring sensor 11 or the recognition result of the autonomous driving ECU 20.

<Supplement to Recording Target>

Figure 17:
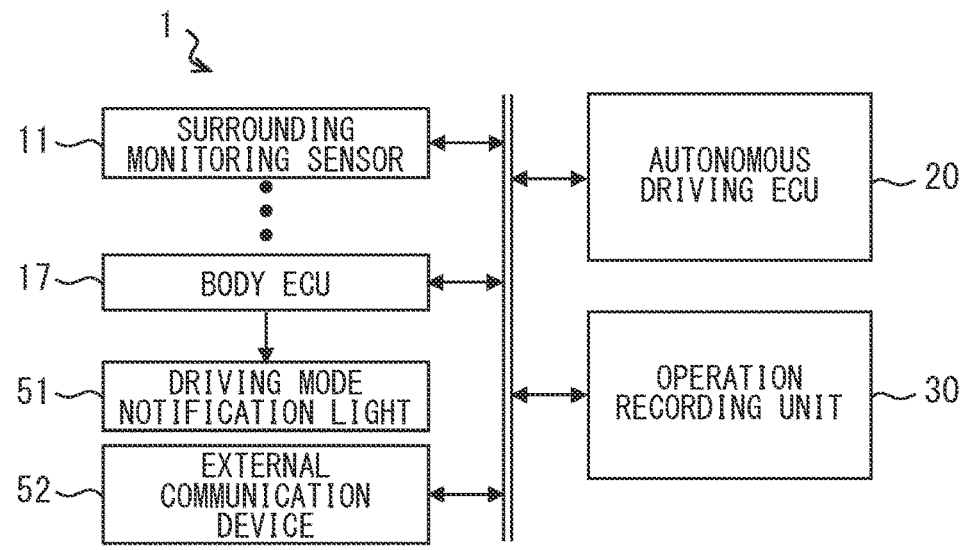
FIG. 17 is a diagram showing a modification of a configuration of the autonomous driving system.

As shown in FIG. 17, when the subject vehicle includes a lamp for notifying the outside of the driving mode as the lighting device (hereinafter, driving mode notification light 51), the recording target setting unit G2 may set a turning-on state of the driving mode notification light 51 as the recording target during the autonomous driving mode. With such a configuration, in a case of the autonomous driving mode, it is possible to verify whether the fact has been properly notified to the outside. The driving mode notification light 51 can be a device that clearly indicates whether the vehicle is in the autonomous driving mode or the occupant involvement mode by the presence or absence of lighting or lighting color. The driving mode notification light may be controlled by the body ECU 17 based on the status information output by the autonomous driving ECU 20.

When the subject vehicle includes an external communication device 52, the recording target setting unit G2 may include an operation state of the external communication device 52 in the recording target. The external communication device 52 is a projector that projects an image for communicating with the pedestrian on the road surface or a window glass. The external communication device 52 is provided in a posture in which the irradiation light hits the road surface or the window glass, for example, on a headlamp or a ceiling portion (for example, in the vicinity of an upper end of a window frame portion) in the vehicle interior. The operation state of the external communication device 52 can include a display image on the road surface or the window glass. As the image for communicating with the pedestrian, an image showing the effect of giving way to the pedestrian, an image showing the moving direction of the subject vehicle, an image showing a target parking position, an image showing the effect that the subject vehicle will transmit soon, an image showing gratitude for the existence that gives way, or the like is assumed. With the above configuration, it is possible to verify whether the communication between the autonomous traveling vehicle and the pedestrian is properly executed.

The recording target setting unit G2 may set the identification information of other vehicles traveling around the subject vehicle as the recording target during the autonomous driving mode. The identification information of the surrounding vehicles can be, for example, vehicle IDs of other vehicles that execute vehicle-to-vehicle communication with the subject vehicle. A vehicle number described on the license plate may be used as the identification information of the surrounding vehicle. The vehicle number can be specified by subjecting the license plate to image recognition. When the recording event, such as the accident, has occurred in the subject vehicle, there is the probability that information indicating the behavior of the subject vehicle is recorded in the vehicle recording devices of the surrounding vehicles. By including the identification information of the surrounding vehicles in the recording target, the vehicles present in the vicinity at the time of the accident can be specified. It can be expected to collect objective data indicating the cause of the occurrence of the accident from the recording devices of other vehicles present around the subject vehicle.

The recording target setting unit G2 may include data indicating the behavior of the surrounding vehicles in the recording target. The behavior of the surrounding vehicles refers to acceleration, overtaking, lane change, stopping, deceleration, or the like. A dangerous action, such as tailgating or road rage driving, may be used as the recording target. Regarding the configuration in which the information of the surrounding vehicles is included in the recording target, the direction, which is the recording target, may be limited to the direction related to the current action and the scheduled action. For example, when the lane change to the right side is planned, the information of other vehicles that travel in a subject vehicle traveling lane and the right lane may be included in the recording target, whereas the information of other vehicles that travel in the left lane of the subject vehicle may be excluded from the recording target. With such a configuration, it is possible to reduce the amount of the data to be stored while recording useful information in the unlikely event of the accident.

When the accident/traffic violation of other vehicles during autonomous traveling is detected, the operation recording unit 30 may report the observation data of the surrounding monitoring sensor 11 for a predetermined time before and after the accident/traffic violation to a predetermined center. Whether other vehicles traveling in the surroundings are the autonomous vehicles can be determined based on the vehicle-to-vehicle communication or the turning-on state of the driving mode notification light 51. By subjecting a sticker indicating that the vehicle is the autonomous traveling vehicle to image recognition, whether other vehicles are the autonomous traveling vehicles may be determined. The center to which the traffic violation is reported is, for example, a center managed by a vehicle manufacturer. With the above configuration, information on the accident or the traffic violation caused by the autonomous driving vehicle is collected by the vehicle manufacturer, so the vehicle manufacturer can grasp under what status the autonomous traveling vehicle has caused the accident or the traffic violation. As a result, the improvement of the autonomous driving system 1 can be promoted. In particular, it is assumed that the ignorance of the stop line or the traffic light is caused by erroneous recognition of the surrounding environment, and the autonomous traveling vehicle itself that has violated the traffic cannot recognize the fact. From such circumstances, it is highly useful to report the traffic violation of the autonomous traveling vehicle by other vehicles to the center.

The recording processing unit G3 may adopt, as the recording event, that the autonomous driving ECU 20 executes the takeover request for the driving operation with respect to the occupant in the driver's seat. Specifically, when the autonomous driving ECU 20 executes the takeover request processing for the driving operation with respect to the occupant in the driver's seat, the recording processing unit G3 may record takeover factor data indicating the reason for the takeover request in the data storage unit Mm. The takeover factor data indicating the reason for the takeover request is acquired from the autonomous driving ECU 20. It is preferable that the storage destination of the takeover factor data be the overwriting prohibition area M2. It is preferable that the takeover factor data be stored as a set with the determination time, the position information, and the data indicating the state of the occupant in the driver's seat.

Further, as described above, the recording processing unit G3 may adopt, as the recording event, that the autonomous driving ECU 20 executes the MRM. Specifically, when the autonomous driving ECU 20 executes the MRM, the recording processing unit G3 may store the data indicating the reason for the execution of the MRM or the observation data of the surrounding monitoring sensor 11 during execution of the MRM, in the overwriting prohibition area M2. It is preferable to include, in the recording target, path plan data, such as the stop target position or the deceleration, set during MRM traveling. It is preferable that the various data described above be stored as a set with the time information, the position information, or the data indicating the state of the occupant in the driver's seat.

In the autonomous driving mode, the recording target setting unit G2 may set, as the recording target, at least one of a positional relationship with the traffic light, the weather information, and the road surface condition. The positional relationship with the traffic light need only be specified based on the high accuracy map data. When the recording event has occurred inside the intersection or in the vicinity of the intersection, the recording processing unit G3 may store, in the overwriting prohibition area M2, the image signal of the front camera 11a for a predetermined time before and after the event occurrence time, and the data indicating the recognition result of the turning-on state of the traffic light as a set. With this configuration, it is possible to verify whether the cause of the accident is the erroneous recognition of the turning-on state of the traffic light by the autonomous driving ECU 20. The vicinity of the intersection means within a predetermined distance (for example, 10 m) from the intersection.

The recording processing unit G3 may store data indicating whether the in-vehicle software is in the latest state in the overwriting prohibition area M2 at a predetermined time. Verification of whether the software related to the autonomous driving is in the latest state need only be realized, for example, by the autonomous driving ECU 20 communicating with the center via the V2X in-vehicle device 16. Verification of whether the software is in the latest state need only be executed at the time when the traveling power supply is turned on or the time when the traveling power supply is turned off when the instruction is executed by the occupant. The recording processing of the verification result of whether the software is in the latest state by the recording processing unit G3 need only be executed, for example, at the time when the verification processing described above ends. In order to use the autonomous driving mode, the occupant in the driver's seat is required to maintain the vehicle in a state of capable of executing its original function. With the above configuration, it is possible for the occupant in the driver's seat to verify whether the in-vehicle software has been properly updated.

During the autonomous driving mode, when a signal indicating that the object detection capability is reduced due to dirt, such as mud or bird droppings, adhering to the sensor surface is input from the surrounding monitoring sensor 11, the autonomous driving ECU 20 may notify the occupant of that fact in cooperation with the HMI system 15. In such a configuration, the recording target setting unit G2 may record whether the occupant has properly responded to the above notification. The appropriate response of the occupant to the above notification includes, for example, switching to the operation mode that can be used without using the surrounding monitoring sensor of which the detection capability is reduced, or an action, such as temporarily stopping the vehicle and wiping off dirt from the sensor. Switching to the operation mode that can be used without using the surrounding monitoring sensor 11 of which the detection capability is reduced refers to, for example, switching to the operation mode with a lower automation level. The HMI system 15 may present to the occupant the operation mode/automation level that can be used without using the surrounding monitoring sensor 11 of which the detection capability is reduced. With the above configuration, it is possible to verify whether the autonomous driving mode is used in an unstable state of the system.

The storage interval of the data by the recording processing unit G3 may be adjusted in accordance with the vehicle speed. For example, the storage interval may be each 50 milliseconds during high speed traveling, each 100 milliseconds during normal traveling, and each 200 milliseconds during low speed traveling. The low speed traveling can be defined as a state in which the vehicle speed is equal to or less than a predetermined first speed (for example, 30 km/h). The normal traveling can be defined as a state in which the vehicle speed is greater than the first speed and is equal to or less than a predetermined second speed (for example, 60 km/h). The high speed traveling can be defined as a state in which the vehicle speed is greater than the second speed. As the vehicle speed is lower, the travel distance per unit time is smaller, so that there is less risk of post-analyzability deterioration even when the storage interval is sparse. By providing a mode in which the storage interval is sparse, it is possible to reduce the storage amount of the data. The first speed may be 10 km/h, 20 km/h, or the like. The second speed may be 80 km/h, 100 km/h, or the like.

A storage quality of the observation data (mainly image data) of the surrounding monitoring sensor 11 may also be changed in accordance with the vehicle speed according to the same technical idea as described above. For example, as the vehicle speed is higher, the storage quality is higher. As the vehicle speed is lower, the observation data may be stored by executing processing of reducing the resolution or reducing the frame rate. A degree of reduction in the resolution need only be decided in accordance with the vehicle speed. A degree of reduction in the frame rate may also be set larger as the vehicle speed is lower.

The storage interval of the data by the recording processing unit G3 during the autonomous driving mode may be adjusted in accordance with a degree of difficulty of the action being executed or scheduled. For example, when traveling along the road, the storage interval may be sparser than when executing complicated control, such as the lane change. Note that, when turning left or right at the intersection, the storage interval may be sparser than when going straight at the intersection. The degree of difficulty of the action can be set higher in the order of traveling along the road segment without the intersection, the lane change, going straight at the intersection, and the left or right turn at the intersection. Even when traveling along the road, the degree of difficulty may be further divided in accordance with whether the road is a sharp curve of which a curvature is equal to or greater than a predetermined threshold or a straight segment. The degree of difficulty of the action may be changed in accordance with whether the preceding vehicle is present. With the above configuration, various data are stored relatively densely when the action (in other words, control) having a high degree of difficulty is executed. Therefore, it is possible to improve the post-analyzability when the accident or the like occurs. With the above configuration, when the control having a low degree of difficulty is executed, various data are stored relatively sparsely, so that the storage amount of the data can be reduced.

Regarding the recording of the state data of the occupant in the driver's seat, a system recognition result, such as eyes on/off, may be stored during the operation mode in which the system is responsible for driving, whereas the face image data may be included in the recording target during the operation mode in which the occupant in the driver's seat is responsible for driving. Even with the above configuration, the storage amount of the data can be reduced while maintaining the analyzability of the cause of the accident. The operation mode in which the system is responsible for driving refers to, for example, the level 4/5 mode. The operation mode in which the occupant in the driver's seat is responsible for the driver's seat refers to the level 0 to 3 mode. The driving responsibility during the MRM may be the occupant in the driver's seat. While the takeover request processing is executed, the face image data may be included in the recording target regardless of the operation mode.

When the data is stored in the data storage unit Mm, the recording processing unit G3 may add verification information for preventing falsification and store the data. As the verification information, for example, a hash value of the data to be stored can be adopted. The hash value can be generated by using a predetermined hash function, such as SHA-256.

The condition for the recording processing unit G3 to execute the event recording processing may be changed in accordance with the surrounding environment or the vehicle type of the subject vehicle. For example, the recording condition in fine weather may be set looser than the recording condition in rainy weather. A recording threshold related to the acceleration, the TTC, the MTC, or the like may be different between when a system-equipped vehicle as the subject vehicle is a passenger car and when the system-equipped vehicle is a large vehicle such as a truck or a trailer. For example, since it takes a relatively long time to brake when the system-equipped vehicle is the large vehicle, such as the truck or the trailer, it is preferable that the recording threshold for the TTC and the MTC be set to a large value. By changing the recording condition in accordance with the surrounding environment or the vehicle type, it is possible to reduce the storage of unnecessary data.

The recording processing unit G3 may change the density of the information to be stored (for example, storage interval, data compression rate, or the like) in accordance with the system stability in the operation mode of level 3 or higher. The system stability here is a control margin with respect to the limit of the autonomous driving system 1. The system stability need only be evaluated by the autonomous driving ECU 20 based on the outputs of various sensors or the recognition result of the surrounding environment. For example, the recording processing unit G3 sets the storage interval to be denser as the system stability calculated by the autonomous driving ECU 20 is lower. The recording processing unit G3 may set the compression rate of the image data output by the surrounding monitoring camera to be higher as the system stability calculated by the autonomous driving ECU 20 is higher. With such a configuration, for example, the amount of information in the vicinity of the moment when the level 4 mode is changed to the level 3 mode or in the vicinity of the moment when the autonomous driving is changed to the manual driving is increased, and the analyzability of the accident or the like is improved.

Figure 18:
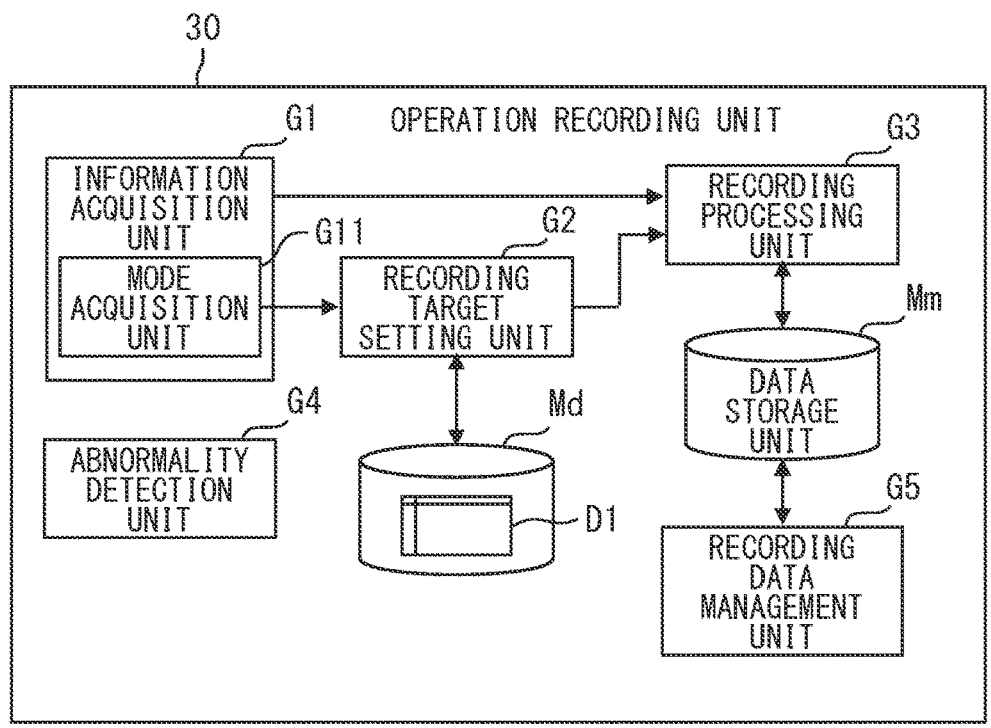
FIG. 18 is a block diagram showing a modification of the configuration of the operation recording unit.

As shown in FIG. 18, the operation recording unit 30 may include a recording data management unit G5 that manages the data stored in the data storage unit Mm. The recording data management unit G5 preferentially deletes other old data when the storage capacity is full such that the data related to the captured image of the front camera 11a remains, for example, for 6 months. The captured image of the front camera 11a for the last one month may be stored in a format corresponding to the observation data, while the older data may be stored by thinning out the data such as reducing the frame rate or the resolution. For example, a Full HD image as the observation data generated by the front camera 11a may be converted into a image graphics array (VGA) captured image with a reduced resolution at the time when a storage period has elapsed for one month. With this configuration, it is possible to reduce the risk that the storage capacity of the data storage unit Mm is full. The format corresponding to the observation data also includes a storage format that maintains a predetermined quality. The storage format of the observation data of the surrounding monitoring sensor 11 does not have to be completely the same as the output format of the front camera 11a on a condition that the quality or the data restoration are guaranteed. The output format of the observation data of the surrounding monitoring sensor 11 may be different from the storage format of the observation data by the recording processing unit G3. For example, the original data may be compressed and stored in a restorable format. Various formats, such as HEVC (H.264) or HEVC (H.265), can be adopted as the storage format of the image data generated by the surrounding monitoring camera. The HEVC is an abbreviation for high efficiency image coding. Still image data and the image signal correspond to captured data.

When the recognition result of the system is included in the recording target (for example, in the autonomous driving mode), the recording target setting unit G2 may include, in the recording target, the information of the application operated in the system and version information of the used software. In other words, the operation recording unit 30 may be configured to record the information of the operation software in the autonomous driving ECU 20 or the like sequentially or at a predetermined time, during the autonomous driving mode. This is because the recognition logic or the determination logic may differ depending on the software version. The software operated in the system includes software operated inside the device constituting the autonomous driving system 1, such as the autonomous driving ECU 20 or the surrounding monitoring sensor 11.

It is preferable that the type information of the application operated in the system be recorded sequentially or at the time when the operation state of the application is changed. The version information of the recognition software or the like used in the system may be recorded at the time when the software update is executed, or may be recorded at the time when the predetermined recording event has occurred. The version information of the software may be recorded each trip or may be each predetermined period (for example, 24 hours). The trip here refers to the traveling from when the traveling power supply is turned on to when the traveling power supply is turned off.

With the above configuration, the recognition result of the autonomous driving ECU 20 or the content of the control instruction are recorded in association with the version information of the recognition software used at that time. Therefore, for example, when the recording event has occurred, it is possible to analyze the cause including what kind of software is operated/used. The information described above may be included in the recording target when the recording event, such as the accident, has occurred.

As shown in FIG. 19, multiple recording target data can be separated and stored for each device as an information source. An individual time stamp may be assigned to each data. Note that, when multiple elements occur at the same time, various data may be collectively recorded by one time stamp. For example, as shown in FIG. 20, the operation states of multiple types of devices at each time may be grouped and stored for each time. With the configuration in which data having a common occurrence/acquisition time are assigned with the same time stamp and are grouped and stored, it is easier to analyze the interaction/interaction between the elements.

As described above, a management mode of the stored data may be for each device or may be for each time. The recording processing unit G3 may assign an event ID for each recording event and store various recording target data. For example, various stored data may be separated for each recording event, and the data having a common occurrence/acquisition time may be grouped by the same time stamp. In FIGS. 19 and 20, for convenience, the time information corresponding to the time stamp is expressed by the concept of year/month/day/hour/minute/second, but the present disclosure is not limited to this. The time stamp may be expressed in epoch seconds. The time stamp may be expressed in universal time coordinated (UTC). The time stamp may include the data for a time finer than 1 second (for example, several milliseconds).

The content of the recording target setting data D1 stored in the recording target setting storage unit Md may be changed, for example, based on the instruction from the server. The recording target setting data D1 may also be configured to be updated by wireless communication with the server as a part of the software. The content of the recording target setting data D1 may be configured to be changed by the operation of the occupant in the driver's seat within a predetermined allowable range.

The operation recording unit 30 may upload the data older than a certain time to the server and delete the data from the data storage unit Mm. The storage area provided in the external server may be used as a part or all of the data storage unit Mm. For example, the overwriting prohibition area M2 may be implemented by using the storage on the cloud. Processing of wirelessly transmitting the recording target data to the cloud server/cloud storage as the data storage unit Mm in cooperation with the V2X in-vehicle device 16 is also included in the processing of sequentially storing the recording target data in the data storage unit Mm.

When the subject vehicle is a remotely operated vehicle, a remote operator (operator) corresponds to the occupant in the driver's seat described above. For example, when the system-equipped vehicle as the subject vehicle is a robot taxi/unmanned operation bus corresponding to the level 3, the operator corresponds to the occupant in the driver's seat.

<Supplement to System Configuration Example>

Figure 21:
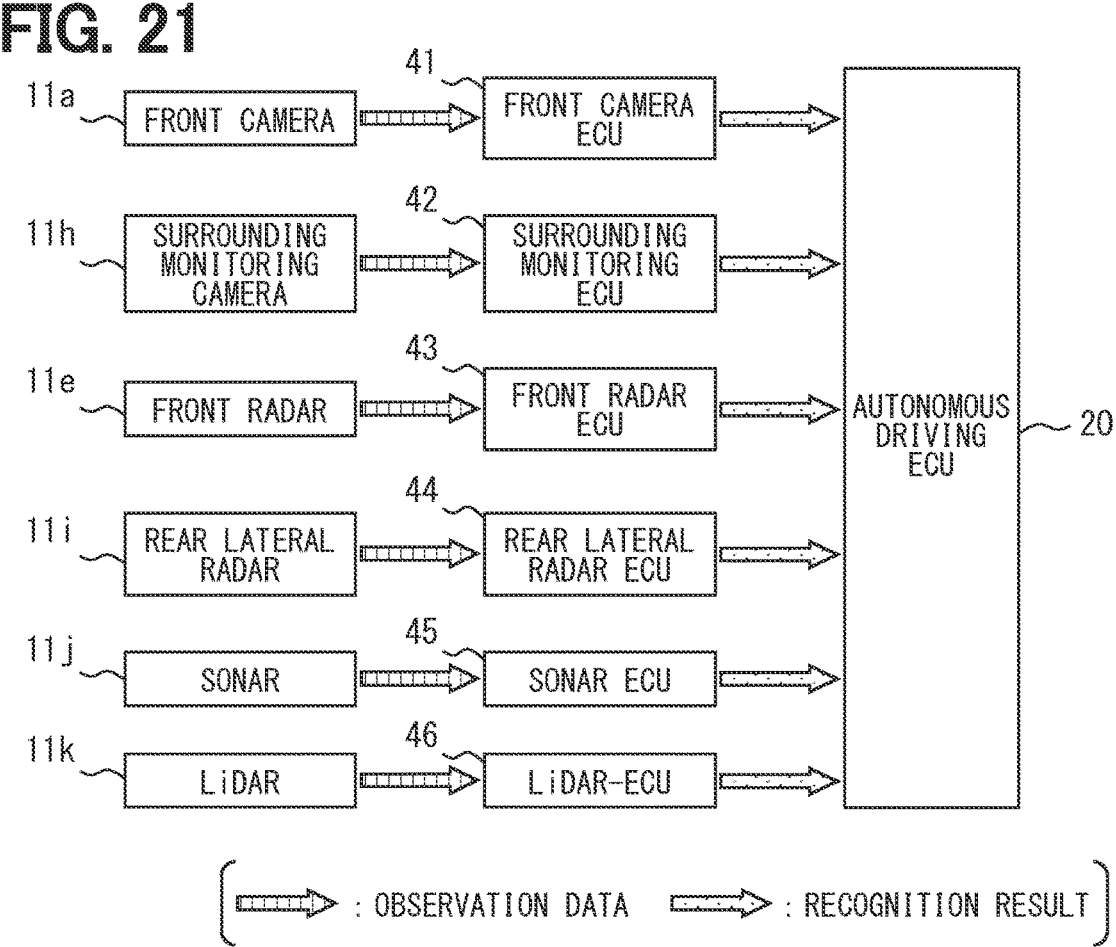
FIG. 21 is a diagram showing a modification of a system configuration.

Various configurations can be adopted as the configuration of the autonomous driving system 1. For example, as shown in FIG. 21, in the autonomous driving system 1, multiple ECUs 41 to 46 may be configured to execute the recognition processing based on the observation data by the surrounding monitoring sensor 11 associated with a subject device and output the recognition processing to the LAN 99. For example, a front camera ECU 41, a surrounding monitoring camera ECU 42, a front radar ECU 43, a rear lateral radar ECU 44, a sonar ECU 45, and a LiDAR-ECU 46 are provided, and each of the ECUs 41 to 46 may be configured to execute the recognition processing based on the observation data of the surrounding monitoring sensor 11 associated with each of the ECUs 41 to 46. In this case, the autonomous driving ECU 20 can be configured to acquire the recognition result from each ECU, integrate the recognition results (so-called fusion), and execute control determination.

The front camera ECU 41 is an ECU that executes the recognition processing on the image captured by the front camera 11a. The surrounding monitoring camera ECU 42 is an ECU that executes the recognition processing on the image captured by the surrounding monitoring camera 11h such as the rear camera 11b. The front radar ECU 43 is an ECU that recognizes the position, the relative speed, the type, or the like of the object present in the front side of the vehicle by analyzing the distance measurement result of the front radar 11e, that is, the reception strength for each detection direction and distance. The rear lateral radar ECU 44 is an ECU that recognizes the position, the relative speed, the type, or the like of the object present on the rear lateral side by analyzing the distance measurement result of a rear lateral radar 11*i*. The rear lateral radar 11*i* includes the right rear radar 11*f* and the left rear radar 11*g*. The sonar ECU 45 is an ECU that estimates the position of the object, more preferably the height or the type of the object by analyzing the distance measurement result of a sonar 11*j*. The LiDAR-ECU 46 is an ECU that specifies the position or the type of the object present in the detection range by analyzing the three-dimensional point cloud data (in other words, distance image data) generated by a LiDAR 11*k*. Each of the ECUs 41 to 46 may be integrally configured with the sensor.

Figure 22:
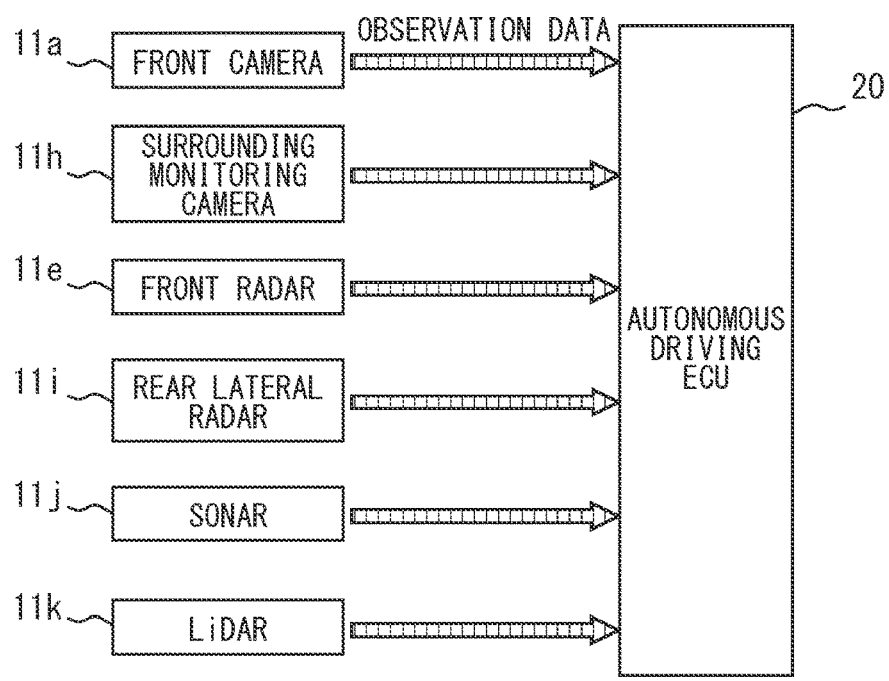
FIG. 22 is a diagram showing a modification of the system configuration.
Figure 23:
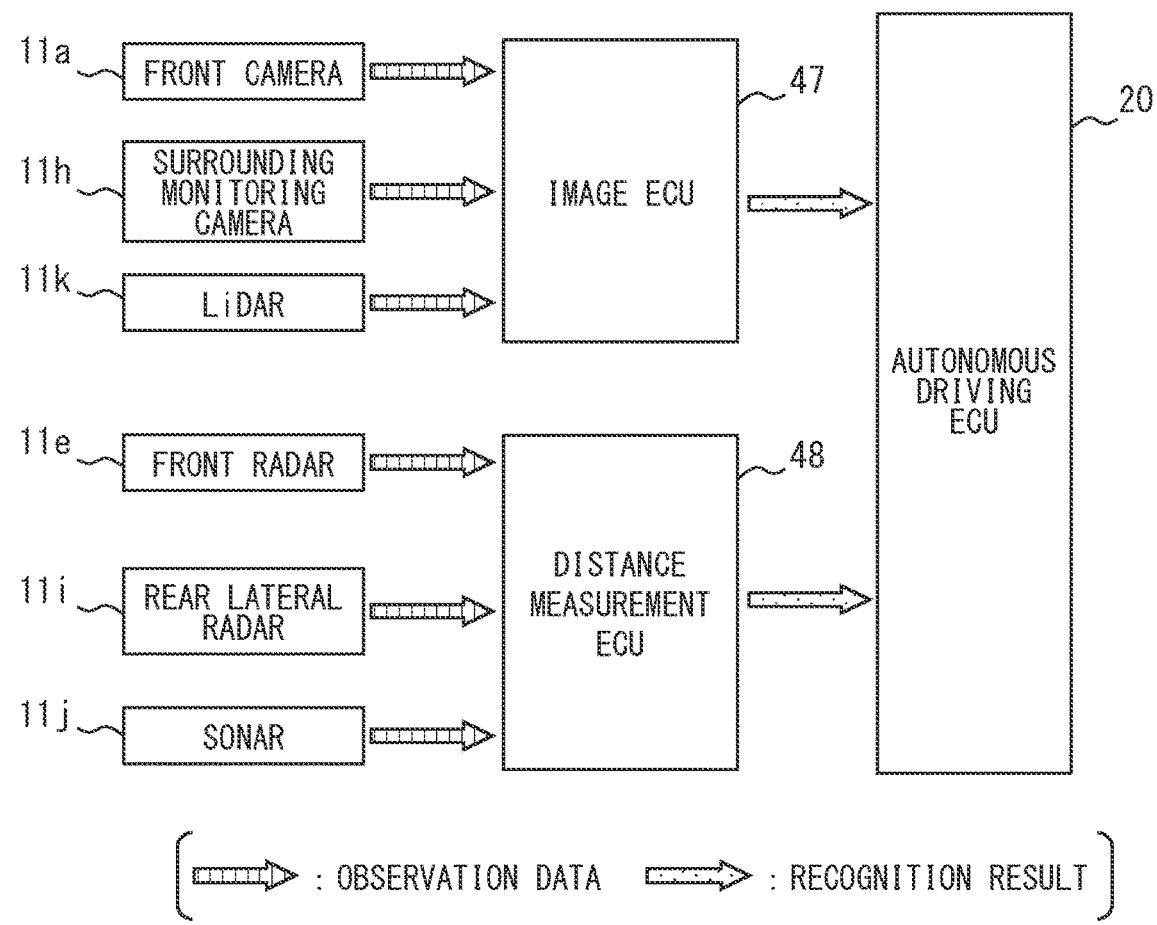
FIG. 23 is a diagram showing a modification of the system configuration.

As shown in FIG. 22, in the autonomous driving system 1, the autonomous driving ECU 20 may be configured to acquire the observation data from each surrounding monitoring sensor 11 and execute the recognition processing based on each observation data, fusion processing, and control determination. As shown in FIG. 23, the configuration in which the recognition processing is executed may be separated into an image ECU 47 that collectively recognizes the image data, such as the camera or the LiDAR, and a distance measurement ECU 48 that comprehensively executes the recognition based on the distance measurement data. The image ECU 47 and the distance measurement ECU 48 may be built in the autonomous driving ECU 20.

Figure 24:
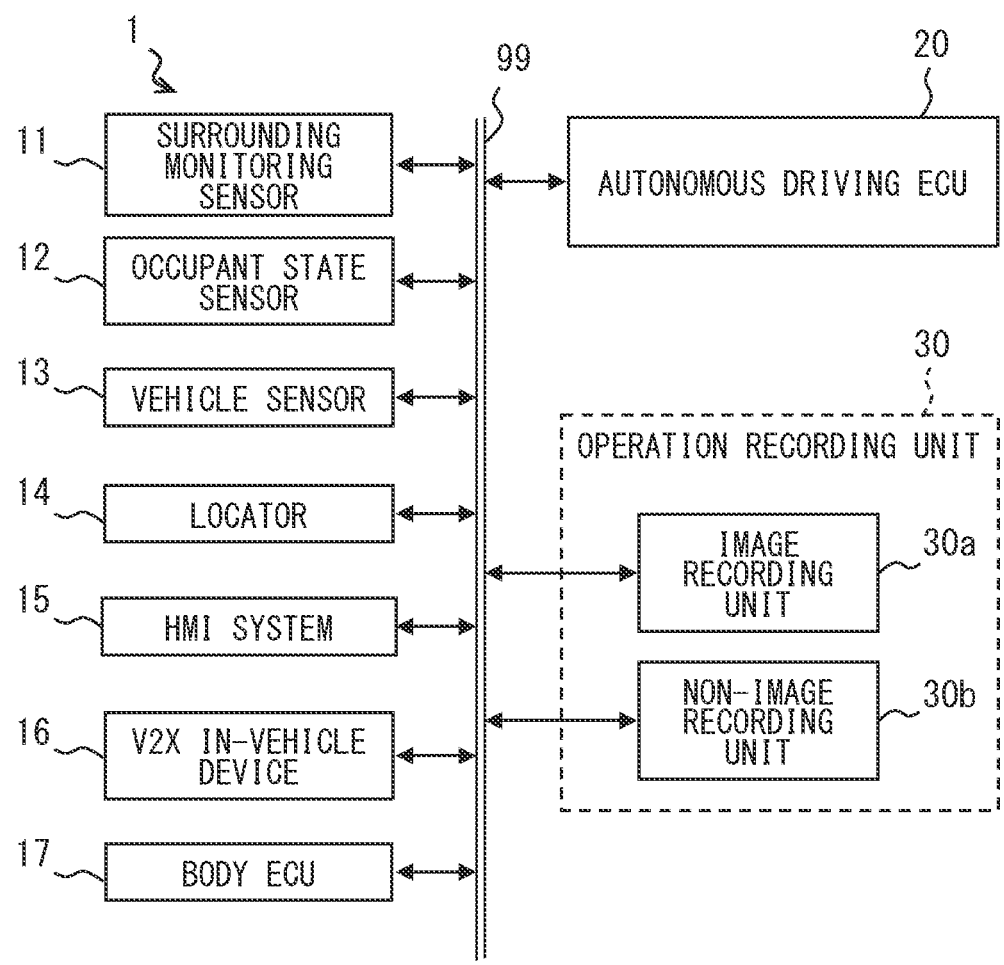
FIG. 24 is a diagram showing a modification of the system configuration.

The configuration of the operation recording unit 30 can be changed as appropriate, and may be divided into, for example, multiple units and disposed. For example, in the operation recording unit 30, as shown in FIG. 24, an image recording unit 30*a* that records the camera image of the front camera 11*a* or the like, and the recognition result based on the camera image may be disposed independently of the unit that records the data other than the above. For convenience, the unit for recording the data that is excluded from the recording target of the image recording unit 30*a* is referred to as a non-image recording unit 30*b*. The image recording unit 30*a* may be integrated with, for example, the navigation apparatus or the front camera 11*a*. The image recording unit 30*a* and the non-image recording unit 30*b* have a configuration in which the functions of the operation recording unit 30 described above are distributed, and the description of the operation recording unit 30 can be used for the specific configuration or operation. In a configuration in which the operation recording units 30 are distributed and disposed in multiple units, it is preferable that the time information of the units be configured to be synchronized by transmitting and receiving the synchronization signal (for example, a pulse signal or the like). For example, it is preferable that the image recording unit 30*a* and the non-image recording unit 30*b* be configured to be synchronized by transmitting and receiving the synchronization signal to each other. This is because the image recording unit 30*a* and the non-image recording unit 30*b* can add the time stamp by using common time information.

<Appendix (Part 1)>

The control unit and the method thereof described in the present disclosure may be implemented by a dedicated computer constituting a processor programmed to execute one or multiple functions embodied by a computer program. The processing units 21 and 31 may be implemented by combining multiple types of processors, such as a CPU, an MPU, a graphics processing unit (GPU), a DFP, or an NPU. Further, for example, some of the functions to be provided by the processing units 21 and 31 may be implemented by using a field-programmable gate array (FPGA), an application specific integrated circuit (ASIC), or the like.

The device and the method thereof described in the present disclosure may be implemented by a dedicated hardware logic circuit. Further, the device and the method thereof described in the present disclosure may be implemented by one or more dedicated computers configured by a combination of a processor that executes a computer program and one or more hardware logic circuits. The computer program is stored in a computer-readable non-transitionary tangible recording medium (non-transitory tangible storage medium) as an instruction executed by the computer. Various storage media, such as a hard-disk drive (HDD), a solid state drive (SSD), an erasable programmable rom (EPROM), a flash memory, a USB memory, or a secure digital (SD) memory card, can be adopted as the storage medium of the program.

<Appendix (Part 2)>

The present disclosure also includes the following technical ideas. The following autonomous driving processing unit corresponds to the autonomous driving ECU 20.

[Technical Idea (1)]

A vehicle recording device that is used in a vehicle having an autonomous driving function and records an operation state of an autonomous driving processing unit (20), which is a computer that provides the autonomous driving function, the device including:

an information acquisition unit (G1) that acquires multiple types of information that can be recording targets from sensors mounted on the vehicle;

a driving mode acquisition unit (G11) that acquires a signal indicating a driving mode corresponding to the operation state of the autonomous driving processing unit;

a recording target setting unit (G2) that changes the recording target in accordance with the driving mode; and a recording processing unit (G3) that executes processing of storing information corresponding to the recording target set by the recording target setting unit in a data storage unit (Mm) implemented by using a predetermined storage medium, in which setting the recording target for each driving mode is changeable by wireless communication with a predetermined server. With this configuration, the recording target for each driving mode can be changed at any time. Therefore, it is possible to flexibly respond to amendments to a law and the like.

[Technical Idea (2)]

When the autonomous driving processing unit is in an autonomous driving mode and deceleration is planned as a scheduled action, the recording target setting unit sets, as the recording targets, observation data of a surrounding monitoring sensor of which a detection direction is a rear side, and an environment recognition result of the autonomous driving processing unit with respect to the rear side. With this configuration, the information in the longitudinal direction in which there is the probability of collision is recorded as unprocessed data, but the observation data in the lateral direction, which has a low risk, is excluded from the recording target. Therefore, it is possible to reduce the amount of the data to be stored while maintaining post-analyzability.

[Technical Idea (3)]

When the autonomous driving processing unit is in the autonomous driving mode and a right turn or a left turn at the intersection is planned as the scheduled action, the recording target setting unit sets, as the recording targets, the observation data of the surrounding monitoring sensor of which the detection direction is front, left, and right sides, and an environment recognition result of the autonomous driving processing unit with respect to the front, left, and the right sides. With this configuration, the unprocessed data in the front and lateral directions in which there is the probability of collision with an oncoming vehicle or a pedestrian crossing the road is recorded, but the observation data in the rear side, which has a low risk, is excluded from the recording target. Therefore, it is possible to reduce the storage amount of the data while maintaining post-analyzability.

[Technical Idea (4)]

When a signal indicating that detection capability is decreased is input from the surrounding monitoring sensor, the autonomous driving processing unit executes processing of notifying the occupant in the driver's seat that the detection capability of the surrounding monitoring sensor is decreased, in cooperation with an HMI system, and the recording processing unit records whether the occupant in the driver's seat executes, in response to the notification, an operation of switching the driving mode to an operation mode which is usable without using a sensor in which the detection capability is decreased, within a predetermined time. With this configuration, it is possible to verify whether or the occupant in the driver's seat uses the autonomous driving device in a state in which the original function is exhibited.

[Technical Idea (5)]

The recording processing unit stores data indicating whether software of the autonomous driving processing unit is in a latest state in the data storage unit based on whether the traveling power supply is turned on or off. With this configuration, it is possible to verify whether the occupant in the driver's seat used the autonomous driving device in a state in which the original function is exhibited.

[Technical Idea (6)]

The data storage unit includes an overwriting possible area (M1) in which data can be deleted and an overwriting prohibition area (M2) in which data cannot be deleted, and the recording processing unit is configured to store data that is set as the recording target by the recording target setting unit and acquired by the information acquisition unit, in the overwriting possible area, and store, when a predetermined recording event has occurred, data acquired within a past predetermined time from a time of the occurrence in the overwriting prohibition area. Examples of the recording event include exiting from the ODD, executing the MRM, lowering the autonomous driving level, or overriding by the occupant in the driver's seat. With this configuration, it is possible to reduce the risk that the data indicating the status when the event has occurred is deleted.

[Technical Idea (7)]

The recording processing unit assigns a hash value for falsification prevention to the data set as the recording target and stores the data. With the above configuration, it is possible to reduce the risk that a part of the stored data is falsified. Alternatively, when the stored data has been falsified with illegally, it is possible to detect that fact.

[Technical Idea (8)]

The observation data of the surrounding monitoring sensor includes a captured image of a front camera (11a) that images a front side of the vehicle, and a data management unit (G5) that manages stored data in the data storage unit such that data related to the captured image of the front camera during the autonomous driving mode is stored for a predetermined period is provided. The predetermined period can be set to 6 months or 3 months. With this configuration, data indicating a forward status during autonomous traveling is likely to remain.

[Technical Idea (9)]

The data management unit stores data of the captured image of the front camera in the observation data or a data format that maintains a predetermined resolution for the last month, and stores data captured earlier than that in a format with a decreased resolution or frame rate. With this configuration, it is possible to reduce the storage amount of the data can be reduced. Since the latest data with high usefulness is stored in a format with a large amount of information, it is possible to reduce the risk that the analyzability of the cause of the accident or the like is impaired.

[Technical Idea (10)]

The autonomous driving processing unit has, as the autonomous driving mode, at least one of a level 3 mode corresponding to an automation level 3, a level 4 mode corresponding to an automation level 4, a level 5 mode corresponding to an automation level 5, and evaluates, during the autonomous driving mode, a control margin of an autonomous travel function based on output of a vehicle-mounted sensor, and the recording processing unit changes density of information to be stored in the data storage unit in accordance with the control margin. The control margin corresponds to the stability of the system. With this configuration, the storage amount of the data is increased in a status in which the control margin is low, so that post-analyzability is improved. On the other hand, the storage amount of the data can be reduced under a status in which the control margin is high.

[Technical Idea (11)]

In the vehicle recording device according to the technical idea (10), the data is acquired and stored at a predetermined first storage interval when the control margin is equal to or greater than a predetermined threshold, and the data is acquired and stored at a second storage interval shorter than the first storage interval when the control margin is less than the predetermined threshold.

[Technical Idea (12)]

An autonomous driving device that provides an autonomous driving function of causing a vehicle to autonomously travel, in which multiple operation modes having different automation levels of a driving operation are provided, the device including:

a surrounding environment recognition unit (F1) that recognizes a surrounding environment including positions of other moving objects based on observation data of a surrounding monitoring sensor;

a mode control unit (F5) that switches the operation modes based on at least either one of a recognition result of the surrounding environment recognition unit and an operation of an occupant in a driver's seat;

an action planning unit (F6) that generates, in the autonomous driving mode in which the vehicle is caused to autonomously travel, an action plan including an action scheduled to be next executed, based on the recognition result of the surrounding environment recognition unit;

a control execution unit (F7) that decides a control amount of a traveling actuator and outputs a control signal of the traveling actuator based on the action plan generated by the action planning unit; and an operation state output unit (F9) that outputs, as recording data set, at least two of the observation data of the surrounding monitoring sensor, the recognition result of the surrounding environment recognition unit, a scheduled action indicating the action scheduled to be next executed, which is planned by the action planning unit, and the control amount of the traveling actuator decided by the control execution unit to a recording device (30).

[Technical Idea (13)]

In the autonomous driving device according to the technical idea (12), during the autonomous driving mode, the operation state output unit outputs, as the recording data set, the observation data of the surrounding monitoring sensor in a direction related to the scheduled action, and the recognition result by the environment recognition unit in the direction related to the scheduled action to the recording device.

[Technical Idea (14)]

In the autonomous driving device according to the technical idea (13), during the autonomous driving mode, when a lane change to a right side or a left side is planned as the scheduled action, the operation state output unit outputs, as the recording data set, the observation data of the surrounding monitoring sensor including, in a detection range, at least a part of a diagonal front side, a lateral side, and a diagonal rear side on a lane change direction side, and the recognition result of the surrounding environment recognition unit in the direction to the recording device.

[Technical Idea (15)]

In the vehicle recording device according to the technical idea (13) or (14), during the autonomous driving mode, when deceleration is planned as the scheduled action, the operation state output unit outputs, as the recording data set, the observation data of the surrounding monitoring sensor of which a detection direction is a rear side and the recognition result of the surrounding environment recognition unit with respect to the rear side to the recording device.

[Technical Idea (16)]

In the vehicle recording device according to any one of the technical ideas (13) to (15), during the autonomous driving mode, when a right turn or a left turn at an intersection is planned as the scheduled action, the operation state output unit outputs, as the recording data set, the observation data of the surrounding monitoring sensor of which the detection direction is the front, left, and right sides, and the recognition result of the surrounding environment recognition unit with respect to the front, left, and right sides to the recording device.

[Technical Idea (17)]

An autonomous driving device that provides an autonomous driving function of causing a vehicle to autonomously travel, in which a level 3 mode corresponding to an automation level 3, and a level 4 mode corresponding to an automation level 4, and an occupant involvement mode in which at least a part of a driving operation is left to an occupant in a driver's seat are provided as an operation mode, the device including:

a surrounding environment recognition unit (F1) that recognizes a surrounding environment including positions of other moving objects based on observation data of a surrounding monitoring sensor;

a mode control unit (F5) that switches the operation modes based on at least either one of a recognition result of the surrounding environment recognition unit and an operation of the occupant in the driver's seat;

an occupant state recognition unit (F2) that acquires occupant state data indicating a state of the occupant in the driver's seat from an occupant state sensor (12a); and a recording processing unit (G3) that records the occupant state data when there is a probability of transferring a driving authority to the occupant in the driver's seat during the level 3 mode or the level 4 mode, in which the recording processing unit is configured to record the occupant state data in the level 3 mode, and record the occupant state data when an exit remaining time, which is a remaining time to exit from an operational design domain set for the vehicle, is less than a predetermined threshold and not to record the occupant state data when the exit remaining time is equal to or greater than the threshold, in the level 4 mode.

The invention claimed is:

1. A vehicle recording device for recording an operation state of an autonomous driving processing unit, which is a computer that is configured to provide an autonomous driving function, the operation state including, as an operating mode, an occupant involvement mode corresponding to any one of autonomous driving levels 0 to 2 and a level 3 mode corresponding to an autonomous driving level 3, the device comprising:

an information acquisition unit that is configured to acquire a plurality of types of information that can be a recording target from a plurality of sensors mounted in a vehicle;

a mode acquisition unit that is configured to acquire a signal indicative of the operating mode of the autonomous driving processing unit;

a recording target setting unit that is configured to change the recording target in accordance with the operating mode; and a recording processing unit that is configured to store information of the recording target set by the recording target setting unit into a data storage unit, wherein the plurality of types of information include occupant state data indicative of a state of an occupant in a driver's seat, and the information acquisition unit is further configured to acquire a face image of the occupant in the driver's seat as the occupant state data, and the recording target setting unit is further configured to:

set the face image as the recording target when the autonomous driving processing unit operates in the level 3 mode; and not set the face image as the recording target when the autonomous driving processing unit operates in the occupant involvement mode.

2. The vehicle recording device according to claim 1, wherein the recording target setting unit is further configured to:

set the face image as the recording target (i) when the autonomous driving processing unit executes take-over request processing for requesting the occupant in the driver's seat to take over a driving operation or (ii) when the autonomous driving processing unit operates in the level 3 mode; and not set the face image as the recording target when the autonomous driving processing unit operates in another operating mode.

3. A vehicle recording device for recording an operation state of an autonomous driving processing unit, which is a computer that is configured to provide an autonomous driving function, the operation state including, as an operating mode, an occupant involvement mode corresponding to any one of autonomous driving levels 0 to 2, the device comprising:

an information acquisition unit that is configured to acquire a plurality of types of information that can be a recording target from a plurality of sensors mounted in a vehicle;

a mode acquisition unit that is configured to acquire a signal indicative of the operating mode of the autonomous driving processing unit;

a recording target setting unit that is configured to change the recording target in accordance with the operating mode; and a recording processing unit that is configured to store information of the recording target set by the recording target setting unit into a data storage unit, wherein the plurality of types of information include occupant state data indicative of a state of an occupant in a driver's seat, and the information acquisition unit is further configured to acquire a face image of the occupant in the driver's seat as the occupant state data, and the recording target setting unit is further configured to:
set the face image as the recording target when the autonomous driving processing unit executes takeover request processing for requesting the occupant in the driver's seat to take over a driving operation; and not set the face image as the recording target when the autonomous driving processing unit operates in the occupant involvement mode.

4. The vehicle recording device according to claim 1, wherein when the autonomous driving processing unit is in an autonomous driving mode, the information acquisition unit is configured to acquire (i) observation data from a surrounding monitoring sensor and (ii) at least one of an environment recognition result indicative of a recognition result of a surrounding environment, information on a scheduled action to be executed, and a control amount of a traveling actuator from the autonomous driving processing unit, and the recording target setting unit is configured to set, as the recording target, (i) at least one of the environment recognition result, the information on the scheduled action, and the control amount and (ii) the observation data from the surrounding monitoring sensor when the autonomous driving processing unit is in the autonomous driving mode.

5. The vehicle recording device according to claim 4, wherein the recording target setting unit is configured to set, as the recording target, (i) the observation data of the surrounding monitoring sensor in a direction in association with the scheduled action and (ii) the environment recognition result of the autonomous driving processing unit in the direction in association with the scheduled action when the autonomous driving processing unit is in the autonomous driving mode.

6. The vehicle recording device according to claim 5, wherein when the autonomous driving processing unit is in the autonomous driving mode and a lane change to a right side or a left side is planned as the scheduled action, the recording target setting unit is configured to set, as the recording target, (i) at least one observation data of the surrounding monitoring sensor having a detection range covering at least a part of a diagonal front side, a lateral side, and a diagonal rear side in a lane change direction (ii) and the environment recognition result of the autonomous driving processing unit regarding the diagonal front side, the lateral side, and the diagonal rear side.

7. The vehicle recording device according to claim 1, wherein the vehicle recording device is used in the vehicle having a driving mode notification light that is a lighting device to notify surroundings that the vehicle is autonomously traveling, and the recording target setting unit is configured to set, as the recording target, an operation state of the driving mode notification light when the autonomous driving processing unit is in an autonomous driving mode.

8. The vehicle recording device according to claim 1, wherein the recording target setting unit is configured to set, as the recording target, identification information of another vehicle around the vehicle when the autonomous driving processing unit is in an autonomous driving mode.

9. The vehicle recording device according to claim 8, wherein the recording target setting unit is configured to set, as the recording target, (i) the identification information of the other vehicle around the vehicle and (ii) data indicative of behavior of the other vehicle when the autonomous driving processing unit is in the autonomous driving mode.

10. The vehicle recording device according to claim 1, wherein the autonomous driving processing unit is configured to determine, during an autonomous driving mode, whether a current status satisfies an autonomous driving permission condition that is set for the vehicle, and when the autonomous driving processing unit determines that the autonomous driving permission condition is not satisfied, the recording processing unit is configured to acquire data indicative of a basis for the determination from the autonomous driving processing unit and store the acquired data in the data storage unit.

11. The vehicle recording device according to claim 1, wherein when the autonomous driving processing unit executes takeover request processing for requesting the occupant in the driver's seat to take over a driving operation, the recording processing unit is configured to acquire data indicative of a reason for executing the takeover request processing from the autonomous driving processing unit and record the acquired data in the data storage unit.

12. The vehicle recording device according to claim 1, wherein the plurality of types of information include a captured image of a front camera that captures a front view of the vehicle, the recording processing unit is configured to:
when the autonomous driving processing unit is in an autonomous driving mode, rewritably store captured data of the front camera; and when a predetermined recording event has occurred, unrewritably store captured data for a predetermined time period, the unrewritably stored captured data being captured within a past predetermined time period prior to, and including, a timing of occurrence of the event, and the data storage unit has a capacity 2000 or more data size of the image data for the predetermined time period.

13. The vehicle recording device according to claim 1, wherein the autonomous driving processing unit has the occupant involvement mode in which at least a part of a driving operation is left to the occupant in the driver's seat, the level 3 mode corresponding to the autonomous driving level 3, and a level 4 mode corresponding to an autonomous driving level 4, and the recording target setting unit is further configured to:
    during the level 3 mode, continuously set the occupant state data as the recording target; and
    during the level 4 mode, (i) set the occupant state data as the recording target when an exit remaining time to exit an operational design domain set for the vehicle is less than a predetermined threshold and (ii) not set the occupant state data as the recording target when the exit remaining time is equal to or greater than the threshold.

14. An information recording method executed by a processor for recording an operation state of an autonomous driving processing unit, which is a computer that provides an autonomous driving function, the operation state including, as an operating mode, an occupant involvement mode corresponding to any one of autonomous driving levels 0 to 2 and a level 3 mode corresponding to an autonomous driving level 3, the method comprising:

acquiring a plurality of types of information that can be a recording target from a plurality of sensors mounted in a vehicle and acquiring a signal indicative of the operating mode of the autonomous driving processing unit;

changing the recording target in accordance with the operating mode; and storing information of the recording target in a data storage unit, wherein the plurality of types of information include data of a face image of an occupant in a driver's seat, and the method further comprises:
    setting the face image as the recording target when the autonomous driving processing unit operates in the level 3 mode; and
    not set the face image as the recording target when the autonomous driving processing unit operates in the occupant involvement mode.

\* \* \* \* \*